United States Patent
Won et al.

(10) Patent No.: US 10,732,818 B2
(45) Date of Patent: Aug. 4, 2020

(54) MOBILE TERMINAL AND METHOD FOR CONTROLLING THE SAME WITH DIPOLE MAGNET INPUT DEVICE

(71) Applicant: LG ELECTRONICS INC., Seoul (KR)

(72) Inventors: Yoonchan Won, Seoul (KR); Yongjae Kim, Seoul (KR); Suyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 295 days.

(21) Appl. No.: 15/371,892

(22) Filed: Dec. 7, 2016

(65) Prior Publication Data
US 2017/0351397 A1 Dec. 7, 2017

(30) Foreign Application Priority Data
Jun. 7, 2016 (KR) .................. 10-2016-0070481

(51) Int. Cl.
*G06F 3/0488* (2013.01)
*G06F 3/01* (2006.01)
(Continued)

(52) U.S. Cl.
CPC ............ *G06F 3/0488* (2013.01); *G06F 3/017* (2013.01); *G06F 3/03545* (2013.01);
(Continued)

(58) Field of Classification Search
CPC ................. G06F 3/033; G06F 3/03545; G06F 2203/04101; G06F 2203/04106;
(Continued)

(56) References Cited

U.S. PATENT DOCUMENTS 6,453,281 B1 * 9/2002 Walters ................. G06F 3/0481
704/200
7,877,705 B2 * 1/2011 Chambers ............. G06F 3/0485
715/835
(Continued)

FOREIGN PATENT DOCUMENTS

WO WO 2015/199280 A1 12/2015

OTHER PUBLICATIONS

Extended European Search Report dated Dec. 13, 2019 in corresponding European patent application No. 19208889.6.

*Primary Examiner* — Kieu D Vu
*Assistant Examiner* — Alvaro R Calderon, IV
(74) *Attorney, Agent, or Firm* — Birch, Stewart, Kolasch & Birch, LLP

(57) ABSTRACT

A mobile terminal including a terminal body; a touch screen; a plurality of magnetic sensors configured to detect a spatial position of an input device having a magnetic field generating unit; and a controller configured to display a first graphic object notifying an area corresponding to the detected spatial position on the touch screen when the spatial position of the input device is detected adjacent to an edge of the terminal body at an outside of the touch screen without contacting the touch screen, and display a second graphic object notifying a hidden function with respect to a displayed area of the first graphic object on the touch screen when the detected spatial position of the input device is fixed for a predetermined time.

15 Claims, 26 Drawing Sheets

(51) Int. Cl.
  *G06F 3/0354* (2013.01)
  *G06F 3/046* (2006.01)
  *G06F 3/0482* (2013.01)
  *G06F 3/0484* (2013.01)
  *G06F 3/0485* (2013.01)
  *G06F 3/041* (2006.01)
  *G06F 3/0481* (2013.01)

(52) U.S. Cl.
  CPC ............ *G06F 3/046* (2013.01); *G06F 3/0482* (2013.01); *G06F 3/0485* (2013.01); *G06F 3/04845* (2013.01); *G06F 3/0416* (2013.01); *G06F 3/04817* (2013.01); *G06F 2203/04101* (2013.01); *G06F 2203/04106* (2013.01)

(58) Field of Classification Search
  CPC . G06F 2203/04801; G06F 2203/04806; G06F 3/017; G06F 3/046; G06F 3/0416; G06F 3/03–04897; G06F 2203/048–04809; H04M 1/2477
  See application file for complete search history.

(56) References Cited

U.S. PATENT DOCUMENTS

| | | | | |
|---|---|---|---|---|
| 8,095,888 B2* | 1/2012 | Jang | | G06F 1/1624 715/801 |
| 9,444,924 B2* | 9/2016 | Rodriguez | | G01C 21/20 |
| 2002/0059350 A1* | 5/2002 | Iwema | | G06F 3/03545 715/234 |
| 2004/0021647 A1* | 2/2004 | Iwema | | G06F 3/0488 345/179 |
| 2004/0141010 A1* | 7/2004 | Fitzmaurice | | G06F 3/0488 715/810 |
| 2005/0038657 A1* | 2/2005 | Roth | | G10L 15/19 704/260 |
| 2005/0128181 A1* | 6/2005 | Wang | | G06K 9/00436 345/156 |
| 2006/0161871 A1* | 7/2006 | Hotelling | | G06F 3/0485 715/863 |
| 2006/0209040 A1* | 9/2006 | Garside | | G06F 3/03545 345/173 |
| 2006/0210958 A1* | 9/2006 | Rimas-Ribikauskas | | G09B 7/00 434/362 |
| 2006/0267966 A1* | 11/2006 | Grossman | | G06F 3/0346 345/179 |
| 2008/0204379 A1* | 8/2008 | Perez-Noguera | | G06F 1/1605 345/80 |
| 2008/0250012 A1* | 10/2008 | Hinckley | | G06F 17/30864 |
| 2009/0187824 A1* | 7/2009 | Hinckley | | G06F 9/453 715/711 |
| 2010/0031169 A1* | 2/2010 | Jang | | G06F 1/1624 715/760 |
| 2010/0333030 A1* | 12/2010 | Johns | | G06F 3/048 715/834 |
| 2011/0109577 A1* | 5/2011 | Lee | | G06F 3/044 345/173 |
| 2011/0157029 A1* | 6/2011 | Tseng | | G06F 3/04883 345/173 |
| 2011/0184730 A1* | 7/2011 | LeBeau | | G10L 15/30 704/201 |
| 2011/0209099 A1* | 8/2011 | Hinckley | | G06F 3/0483 715/863 |
| 2011/0221776 A1* | 9/2011 | Shimotani | | G06F 3/0421 345/647 |
| 2012/0022872 A1* | 1/2012 | Gruber | | G06F 17/279 704/270.1 |
| 2012/0036556 A1* | 2/2012 | LeBeau | | G06F 3/048 726/3 |
| 2012/0221938 A1* | 8/2012 | Patterson | | G06F 17/2235 715/232 |
| 2012/0306927 A1* | 12/2012 | Lee | | G06F 3/041 345/660 |
| 2013/0257777 A1* | 10/2013 | Benko | | G06F 3/03545 345/173 |
| 2014/0055395 A1* | 2/2014 | Kim | | G06F 3/0485 345/173 |
| 2014/0208957 A1* | 7/2014 | Imai | | H05B 6/6435 99/342 |
| 2014/0253465 A1* | 9/2014 | Hicks | | G06F 3/03545 345/173 |
| 2014/0253522 A1* | 9/2014 | Cueto | | G06F 3/03545 345/179 |
| 2014/0267084 A1* | 9/2014 | Krulce | | G06F 3/0416 345/173 |
| 2014/0327659 A1 | 11/2014 | Chen | | |
| 2014/0380247 A1* | 12/2014 | Tecarro | | G06F 3/0483 715/863 |
| 2015/0067513 A1* | 3/2015 | Zambetti | | G06F 3/0482 715/716 |
| 2015/0261376 A1* | 9/2015 | Kim | | G06F 3/0487 345/173 |
| 2015/0338928 A1* | 11/2015 | Kim | | G06F 3/033 715/765 |
| 2016/0004427 A1* | 1/2016 | Zambetti | | G06F 3/0488 715/802 |
| 2016/0026272 A1* | 1/2016 | Park | | G06F 3/04886 345/173 |
| 2016/0154519 A1* | 6/2016 | Joo | | G06F 3/0488 345/156 |
| 2016/0259497 A1* | 9/2016 | Foss | | G06F 3/0482 |
| 2016/0266652 A1* | 9/2016 | Son | | G06F 3/01 |
| 2016/0357404 A1* | 12/2016 | Alonso Ruiz | | G06F 3/0483 |
| 2017/0068371 A1* | 3/2017 | Fleizach | | G06F 3/0488 |
| 2017/0115867 A1* | 4/2017 | Bargmann | | G06F 3/04883 |
| 2017/0285745 A1* | 10/2017 | Doran | | G06F 3/016 |
| 2017/0351397 A1* | 12/2017 | Won | | G06F 3/03545 |

* cited by examiner

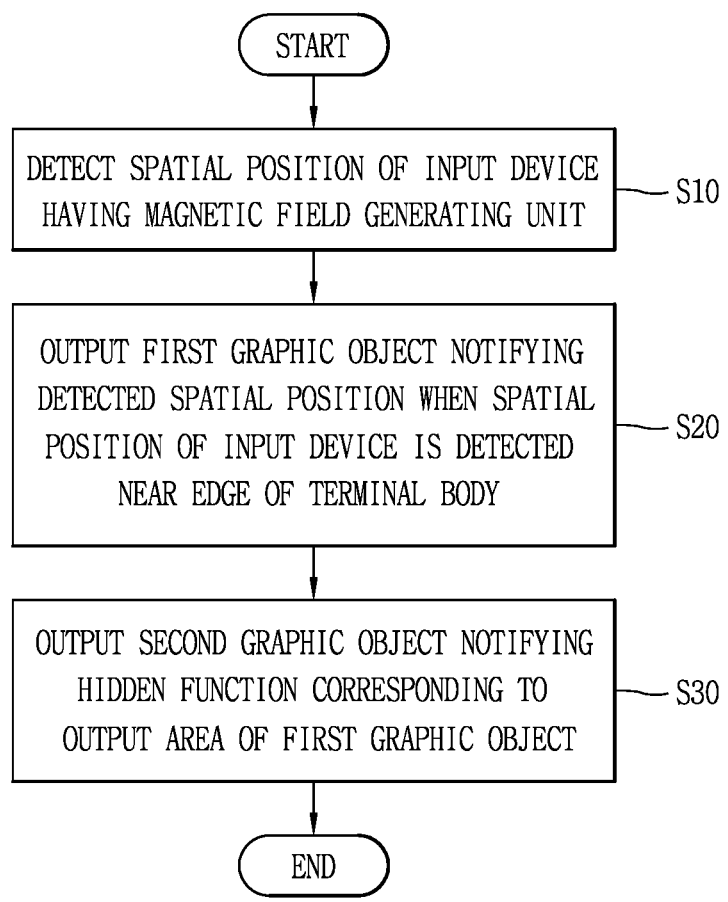

FIG. 18B
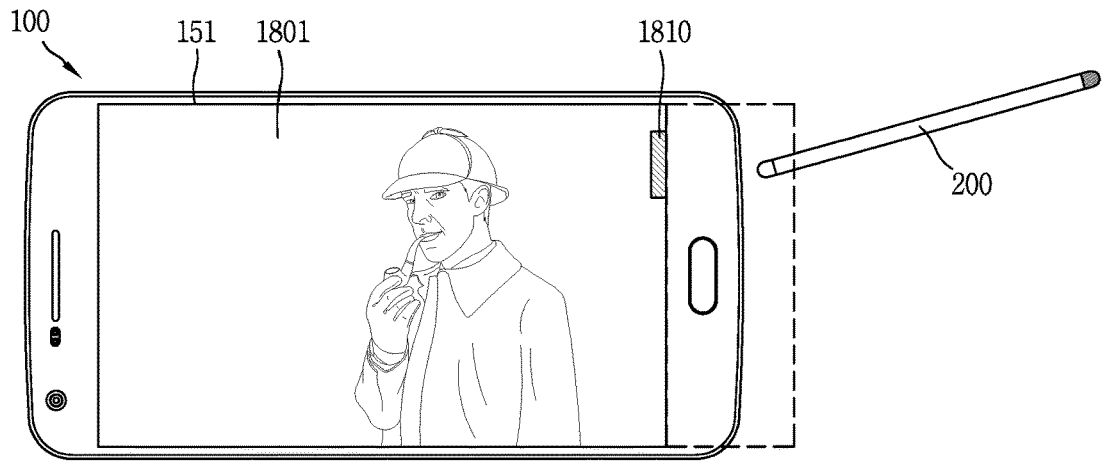
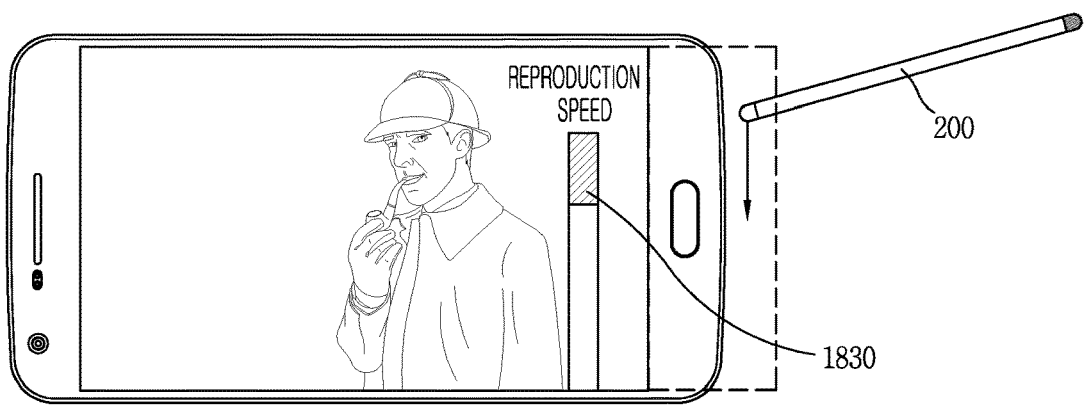
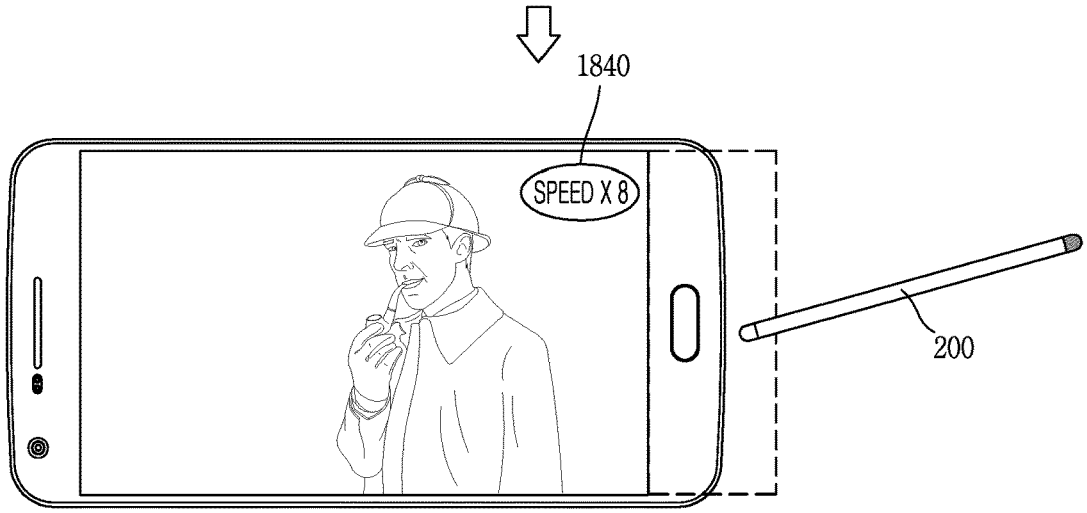

MOBILE TERMINAL AND METHOD FOR CONTROLLING THE SAME WITH DIPOLE MAGNET INPUT DEVICE

CROSS-REFERENCE TO RELATED APPLICATION

Pursuant to 35 U.S.C. § 119(a), this application claims the benefit of an earlier filing date of and the right of priority to Korean Application No. 10-2016-0070481, filed on Jun. 7, 2016, the contents of which are incorporated by reference herein in their entirety.

BACKGROUND OF THE INVENTION

1. Field of the Invention

This specification relates to a mobile terminal capable of performing an input operation using an input device, and a method for controlling the same.

2. Background of the Invention

Terminals may be divided into mobile/portable terminals and stationary terminals. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player. As an example of such function, to input a control command on a display of a terminal, a user may execute writing or the like using a tool such as a stylus pen or the like without a direct touch with a finger. When such writing or the like is executed using the tool, a position (location) of the tool may be recognized based on a sensor provided on the mobile terminal and an input applied to the display.

Meanwhile, while performing an input to the terminal using the tool, the user continuously grips the tool, which makes it difficult for the user to perform various gestures. Also, the user's hand holding the tool frequently obscures a screen. Therefore, a UI/UX which allows for various inputs with minimizing an obscured area of the screen when inputting a control command using a tool is required.

SUMMARY OF THE INVENTION

Therefore, an aspect of the detailed description is to provide a mobile terminal, capable of performing various hidden functions with minimizing an obscured area of a screen even while inputting a control command using an input tool, and a method for controlling the same.

To achieve these and other advantages and in accordance with the purpose of this specification, as embodied and broadly described herein, there is provided a mobile terminal, including a terminal body, a touch screen disposed on a front surface of the terminal body, a sensing unit configured to detect a spatial position of an input device using a plurality of magnetic sensors, the input device having a magnetic field generating unit, and a controller configured to output a first graphic object notifying the detected spatial position on the touch screen when the spatial position of the input device is detected adjacent to an edge of the terminal body at an outside of the touch screen, wherein the controller outputs a second graphic object notifying a hidden function with respect to an output area of the first graphic object when the spatial position of the input device is fixed for a predetermined time.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 5 is a flowchart illustrating the operations of FIG. 4; and

FIGS. 6A, 6B, 6C, 6D, 7A, 7B, 8, 9, 10, 11, 12, 13, 14, 15, 16A, 16B, 17, 18A and 18B are views illustrating examples of executing a hidden function based on a spatial position of an input device that is moved near an edge of a terminal body, in a mobile terminal according to an embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. A singular representation may include a plural representation unless it represents a definitely different meaning from the context.

Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
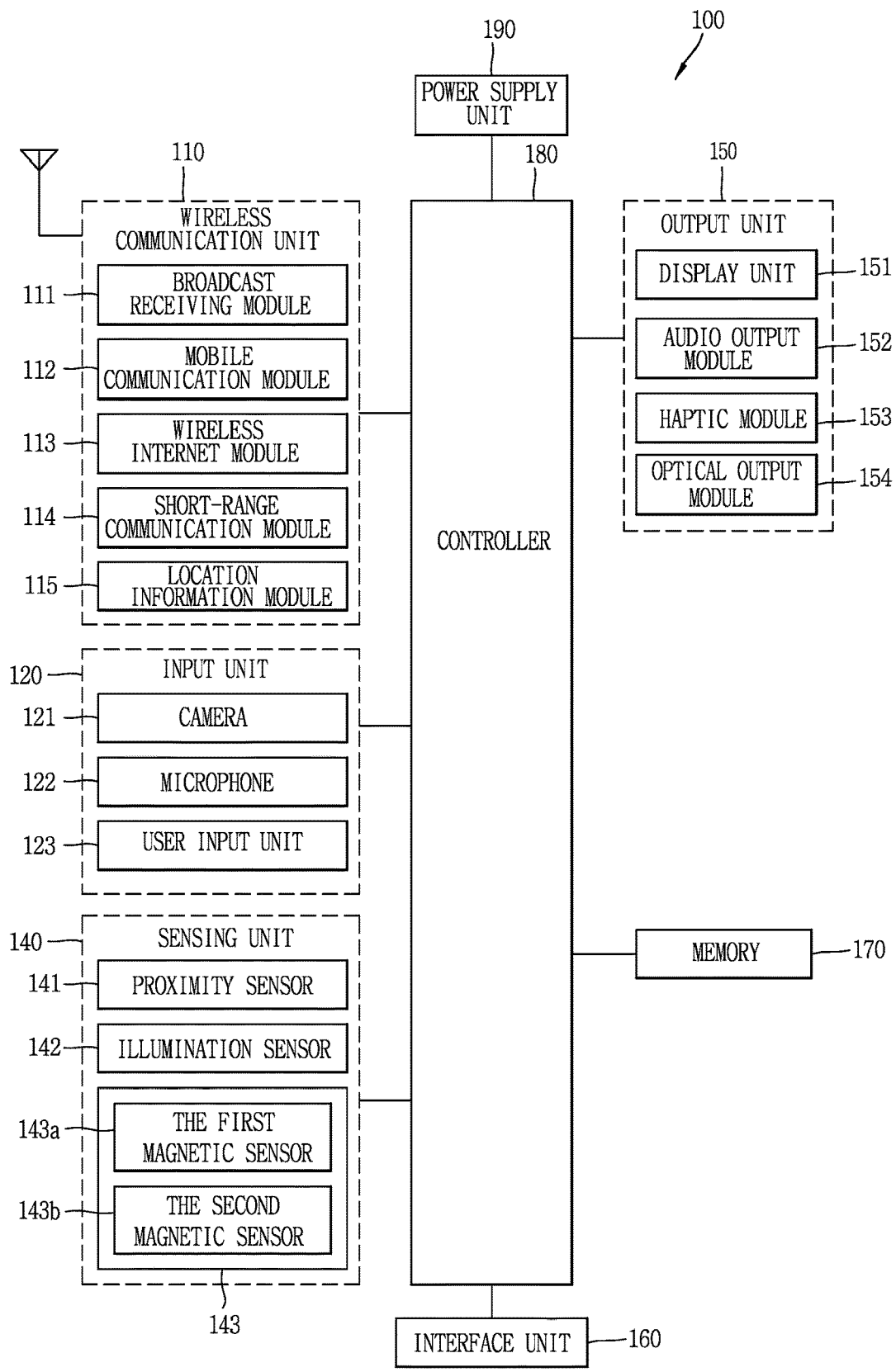
FIG. 1A is a block diagram of a mobile terminal according to an embodiment of the present invention.
Figure 1B:
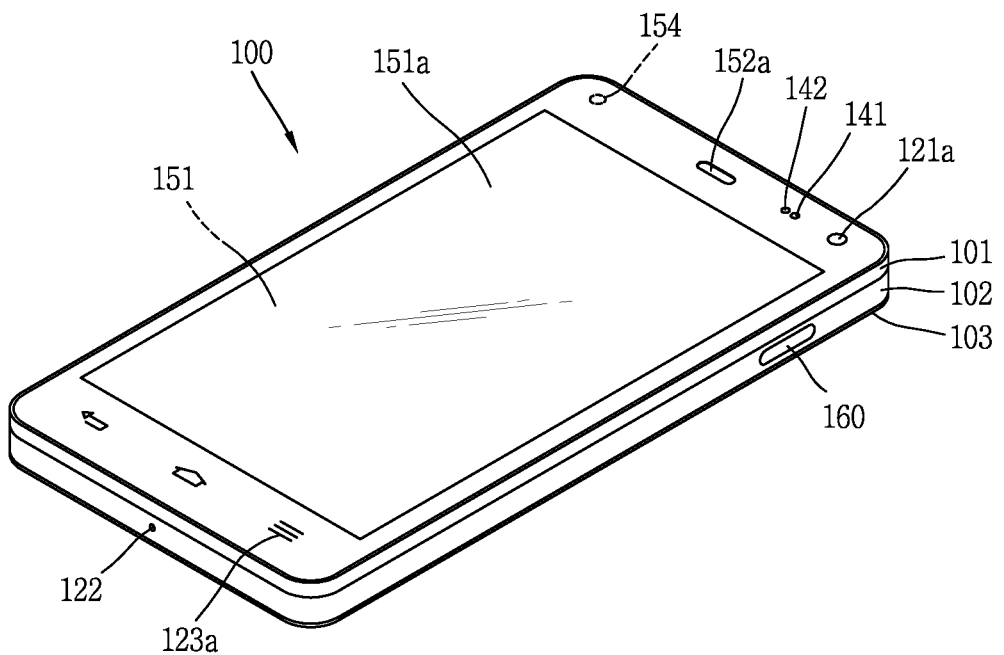
FIGS. 1B and 1C are conceptual views illustrating one example of a mobile terminal, viewed from different directions.
Figure 1C:
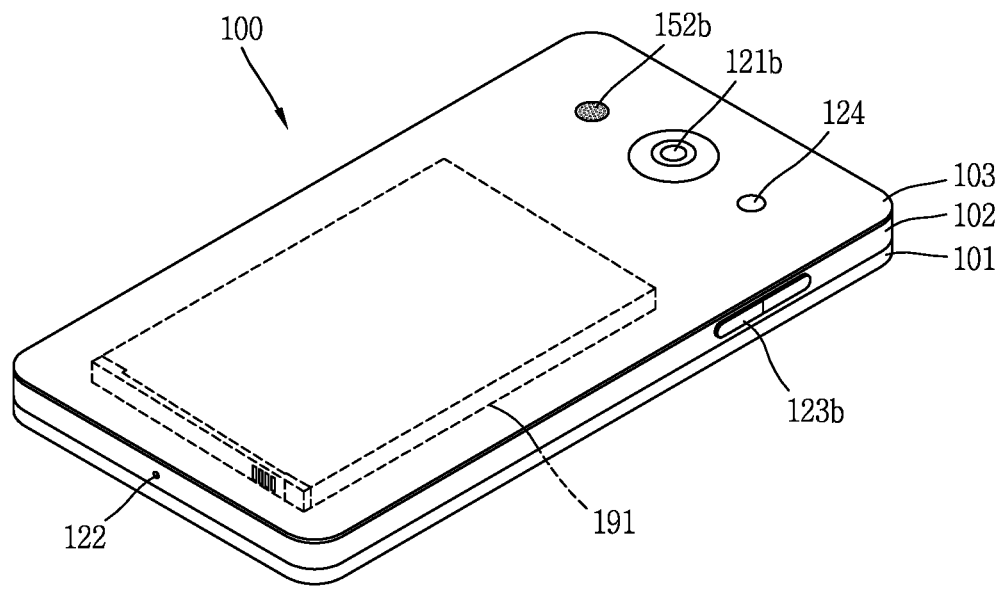

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

A magnetic sensor 143 refers to a sensor that detects presence or absence of an object, which is approaching a predetermined detection surface or exists near the detection surface, and a location and direction of the corresponding object, using force of a magnetic field. That is, the magnetic sensor 143 refers to a sensor of measuring a magnitude and direction of a surrounding magnetic field or magnetic flux line. In the present invention, the mobile terminal 100 can be provided with at least some three-axial magnetic sensors 143a and 143b to more accurately detect a location and direction of an object generating a magnetic field.

Thus, the plurality of three-axial magnetic sensors 143a and 143b are provided in an independent manner, and disposed in different directions with being spaced apart from each other by a predetermined distance. Accordingly, the controller 180 can perform a different processing operation according to a magnitude of a magnetic field value measured by the plurality of magnetic sensors 143a and 143b. In more detail, a location, a direction, an angle and the like of an object that generates a magnetic field may be detected according to a magnitude of a magnetic field value measured by the plurality of three-axial magnetic sensors 143a and 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule alarm, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control an operation associated with an application program and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly. The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Figure 2A:
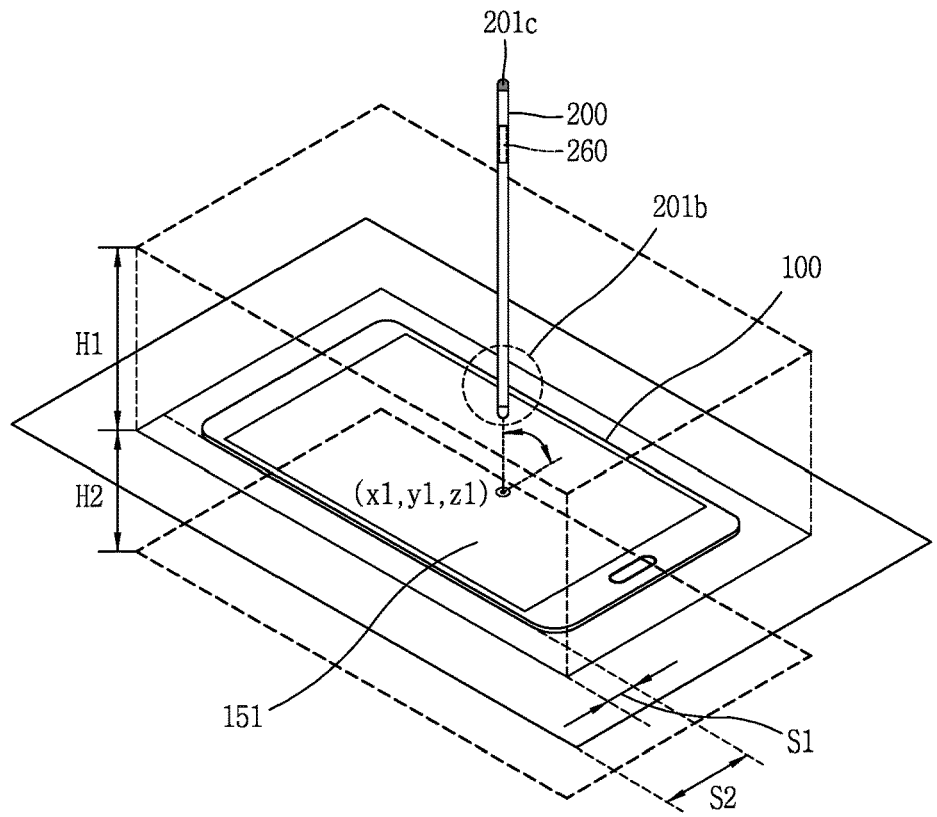
FIGS. 2A and 2B are views each illustrating an example that a spatial position of an input device is detected using a plurality of magnetic sensors in a mobile terminal according to an embodiment of the present invention.
Figure 2B:
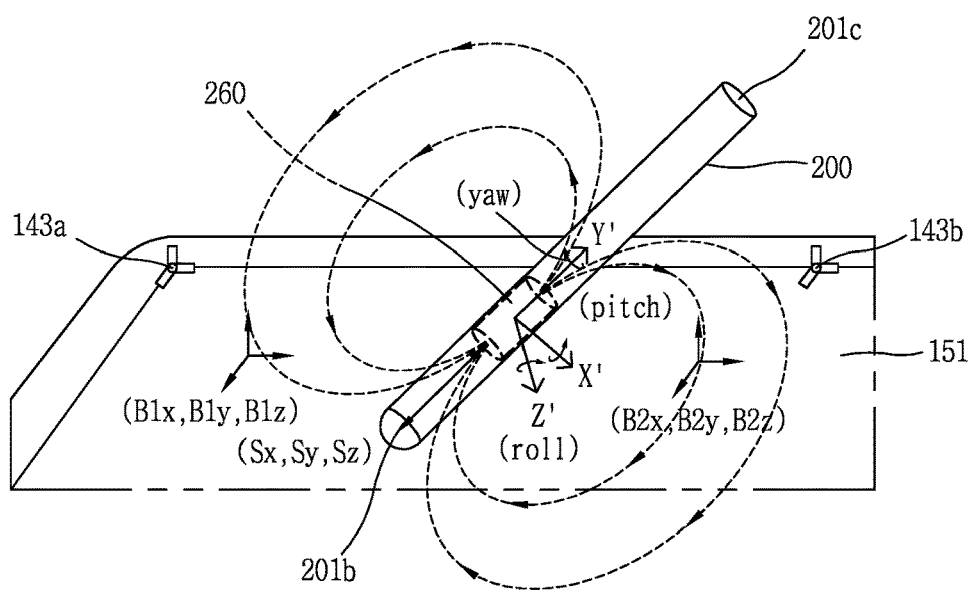

First, FIGS. 2A and 2B are views of detecting (sensing) a spatial position of an input device using a plurality of magnetic sensors in a mobile terminal according to an embodiment of the present invention. As illustrated in FIGS. 2A and 2B, the mobile terminal 100 can recognize a contact point Sx, Sy, Sz of an input device 200 on the touch screen 151 or a spatial position x1, y1, z1 near the mobile terminal 100 within a reference range out of the touch screen 151, using a plurality of three-axis magnetic sensors 143a and 143b. The three-axis magnetic sensors 143a and 143b, as illustrated in FIG. 2B, may be disposed near corners of one side of the mobile terminal 100 with being spaced apart from each other.

Each of the three-axis magnetic sensors 143a and 143b may measure a magnitude of a magnetic field generated in a right angle direction to one another. For example, the first magnetic sensor 143a may acquire magnetic field values B1$x$, B1$y$ and B1$z$ by measuring magnitudes of magnetic fields around it in x, y and z-axial directions, and the second magnetic sensor 143b may acquire magnetic field values B2$x$, B2$y$ and B2$z$ by measuring magnitudes of magnetic fields around it in the x, y and z-axial directions. Based on the acquired magnetic field values B1$x$, B1$y$, B1$z$, B2$x$, B2$y$ and B2$x$, position, orientation and angle of the input device 200 which generates the magnetic fields can be detected.

Thus, a magnetic field generating unit 260, for example, a dipole magnet which generates a magnetic field is disposed in an inner space of the input device 200. The magnetic field generating unit 260 may be installed such that a central axis of rotation of the input device 200 coincides with a Y' axis (see FIG. 2B) of the dipole magnet. In this instance, the position and orientation of the magnetic field generating unit 260 may be expressed by 5 degrees of freedom, namely, central positions (x, y and z) of the dipole magnet and rotational angles (roll and pitch) with respect to X' and Z' axes which are independent of the Y' axis. Here, a rotation yaw of the input device 200 and the magnetic field generating unit 260 centering on the Y' axis does not make a difference in the magnetic field sensor value of the magnetic field generating unit 260.

Also, in the present invention, six magnetic field values can be obtained through the plurality of three-axis magnetic sensors, and thus position, orientation and angle of the magnetic field generating unit 260 having such 5 degrees of freedom can be specified. Thus, a nonlinear function which describes correlation among the spatial position of the input device 200 and the magnetic field values B1$x$, B1$y$, B1$z$, B2$x$, B2$y$ and B2$z$, which correspond to the values of the degrees of freedom of the central positions x, y and z and the rotational angles roll and pitch of the magnetic field generating unit 260, may be prestored in the mobile terminal 100 in a software configuration.

Also, in one example, to sense the spatial position of the input device 200, more sensors, such as an acceleration sensor, a gyroscope, a camera and the like, may be used in addition to the three-axis magnetic sensors. When the magnetic field values obtained through the plurality of three-axis magnetic sensors are transferred to the controller 180, the controller 180 can recognize the spatial position of the input device 200 and perform an output associated with the touch screen 151.

Also, FIG. 2A illustrates recognition ranges H1, H2, S1 and S2 of the spatial position of the input device 200 sensed near the mobile terminal 100. In more detail, the spatial position of the input device 200 including the magnetic field generating unit 260 therein may be detected within an upper space H1, a lower space H2 and side spaces S1 and S2 (hereinafter, referred to as 'reference range') based on the touch screen 151 of the mobile terminal 100. For example, even when the input device 200 is located near a rear surface of the mobile terminal 100 within the reference range, the controller 180 can output an indication corresponding to the spatial position of the input device 200 on the touch screen 151.

Hereinafter, recognizing the spatial position of the input device 200 may also be understood as recognizing a hovering input by the input device 200. In this instance, width, height, size and the like of the reference range may differ according to a magnitude of the magnetic field generated in the magnetic field generating unit 260 provided in the input device 200, for example, strength of the magnetic field of the dipole magnet. For example, when the magnetic field of the dipole magnet has higher strength, the recognition range of the spatial position of the input device 200 may extend more.

Meanwhile, as illustrated in FIG. 2B, when one end portion 201b of the input device 200 is brought into contact with one point of the touch screen 151, a position Sx, Sy, Sz pressed by the one end portion 201b may be detected by the touch screen 151. In this instance, the position, orientation and angle of the input device 200 can accurately be measured merely by one three-axis magnetic sensor. Also, while writing on the touch screen 151 with the input device 200, the controller 180 can distinguish a touch applied by a hand and ignore such touch.

Also, in the present invention, a calibration process for removing/considering a magnetic field (hereinafter, referred to as 'environmental magnetic field') generated due to noise and the like, which are caused by a magnetic field of the Earth, a sensor offset, an AC power source line near the mobile terminal and the like, is merely executed once at the beginning. In more detail, a changed value of the magnetic field is measured based on magnetic field values corresponding to the initial position, orientation and angle of the input device 200, which are sensed through the plurality of three-axis magnetic sensors. Therefore, even through the spatial position of the input device 200 changes, an additional calibration is not needed.

Figure 3A:
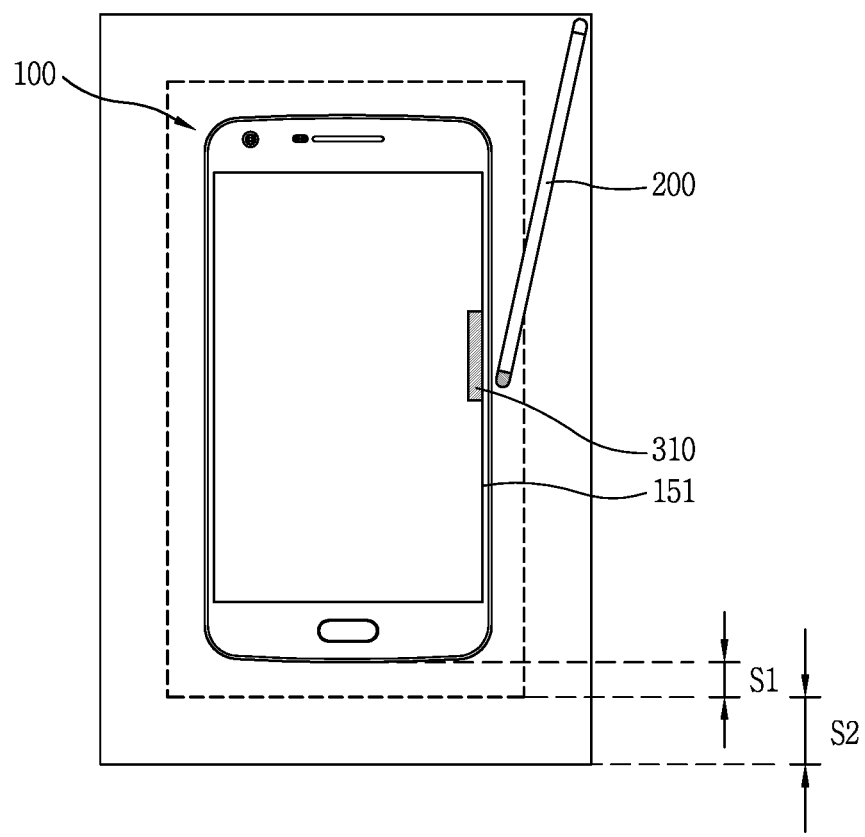
FIGS. 3A, 3B and 3C are exemplary views illustrating a screen change caused in response to a change in a spatial position of an input device, in a mobile terminal according to an embodiment of the present invention.
Figure 3B:
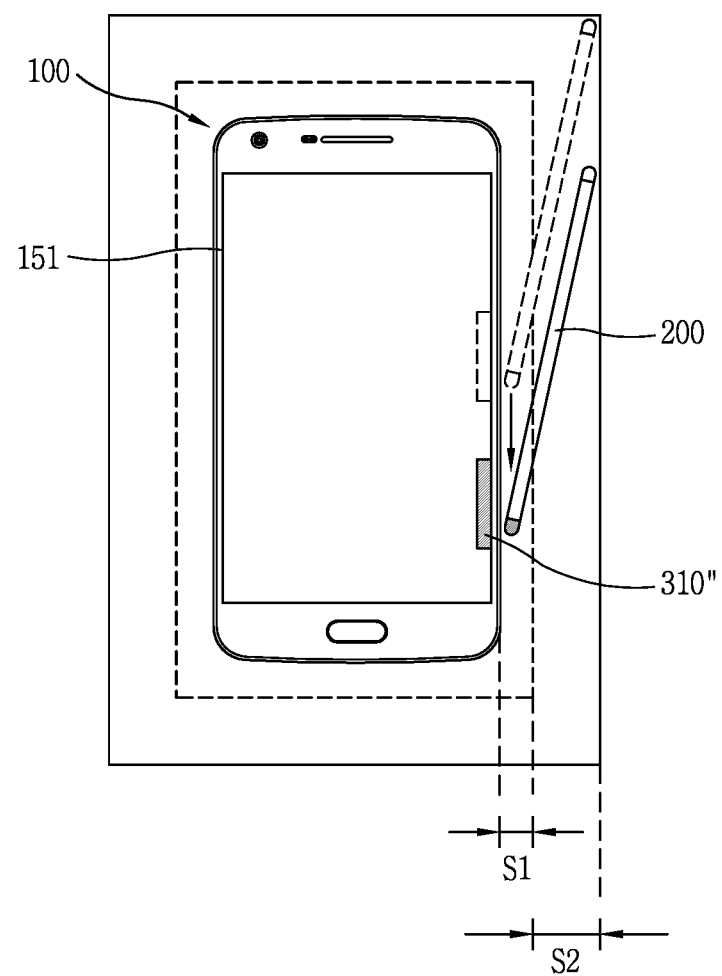
Figure 3C:
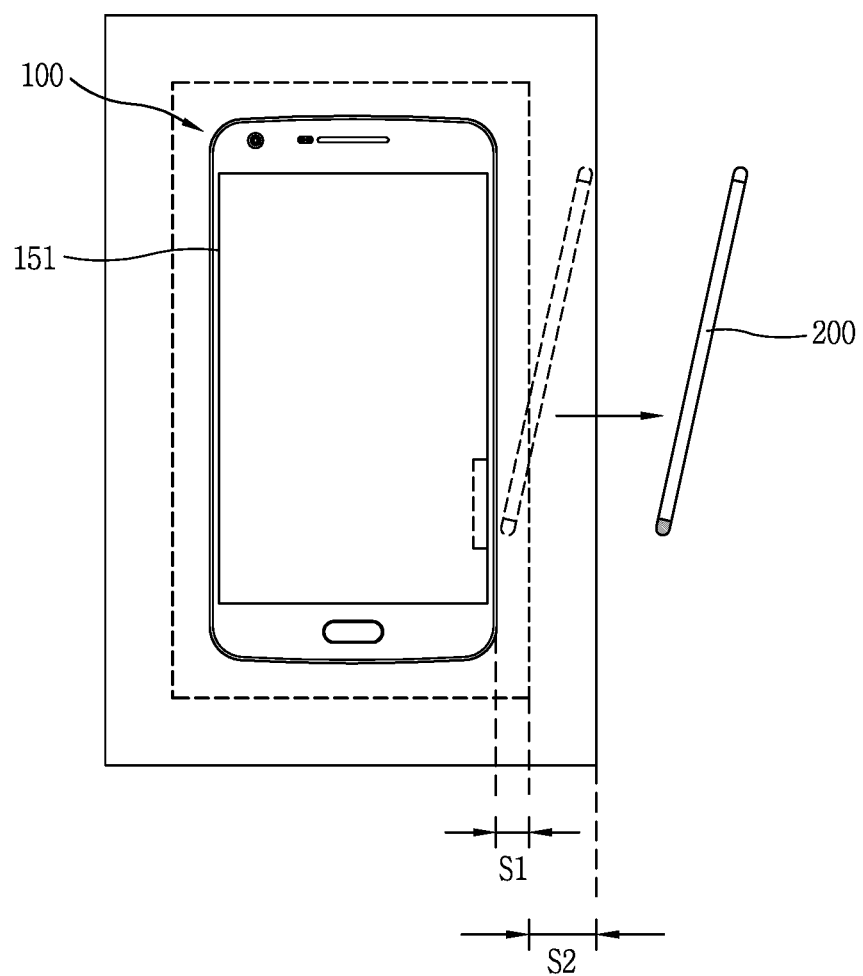

Next, FIGS. 3A, 3B and 3C are exemplary views illustrating a screen change of the touch screen 151 caused in response to a change in a spatial position of the input device 200, in a mobile terminal according to an embodiment of the present invention. First, as illustrated in FIG. 3A, when the input device 200 including the magnetic field generating unit therein is located near (within an area S1 at) an edge of a side surface (or a side edge) of the mobile terminal 100 without coming in contact with the touch screen 151, an indication indicating the spatial position of the input device 200, for example, a bar-like graphic object 310 can be output on one edge area of the touch screen 151 of the mobile terminal 100.

Here, the position of the graphic object 310 corresponds to a position of the input device 200 which is detected through the plurality of three-axial magnetic sensors provided in the mobile terminal 100. Actually, since the input device 200 is located near the side edge of the touch screen 151 at an outside of the touch screen 151 without a direct contact with the touch screen 151, the graphic object 310 is output on an edge area of the touch screen 151 which is the closest to the spatial position of the input device 200. Also, a Z-axial position of a touch applied to the area S1 by the one end portion 201b of the input device 200 is actually different from a Z-axial position of the touch screen 151, but it may be assumed that the Z-axial position of the touch applied to the area S1 is 0, on the basis that the position is close or similar to a surface of the touch screen.

In addition, as another example, when an initial position of the input device 200 is near (within an area S2 at) a side edge of the mobile terminal 100, the bar-like graphic object 310 may not be output, can be output in a blurred manner even though output, or can be output to induce a movement close to a terminal body. This is because the input device 200 is easily to be moved out of the reference range, in response to a movement to be made, when the input device 200 is located in the area S2 from the beginning.

In this state, as illustrated in FIG. 3B, when the input device 200 is moved along the edge of the touch screen 151 in the Y-axial direction outside the touch screen 151, the bar-like graphic object is also moved to correspond to the moved position of the input device 200 (310"). Also, a moving speed of the bar-like graphic object 310" corresponds to a moving speed of the input device 200.

Meanwhile, as illustrated in FIG. 3C, when the input device 200 is moved out of a recognition range, namely, the reference range of the spatial position beyond a boundary of the side space (i.e., area) S2, the spatial position of the input device 200 may not be detected any more, and thus the bar-like graphic object 310 disappears.

Thus, even though the input device 200 is located within a side surface of the touch screen 151 without a contact with the touch screen 151, the controller 180 can recognize the spatial position and indicate the position on the touch screen 151. Accordingly, a specific area of the touch screen 151 can be selected and related processing can be performed.

The mobile terminal 100 according to the embodiment of the present invention can detect the spatial position of the input device 200 having the magnetic field generating unit 260, by using the plurality of magnetic sensors provided in the terminal body. Also, the controller 180 can output a first graphic object notifying the detected spatial position on the touch screen 151, in response to the spatial position of the input device 20 being detected near an edge of the terminal body out of the touch screen 151 of the mobile terminal 100. Also, in this state, when the spatial position of the input device 200 is fixed for a predetermined time, a second graphic object which notifies a hidden function with respect to the output area of the first graphic object is displayed.

Here, the spatial position may be expressed by x, y and z axes based on the touch screen 151. The controller 180 can store magnetic field values corresponding to an initial spatial position of the input device 200, and then continuously detect the spatial position, orientation and angle (inclined degree) of the input device 200 based on changes in the magnetic field values.

The first graphic object can be output as an image, such as a bar-like graphic object, a cursor, a point, a prompt, a pointer and the like. Also, the second graphic object is an image allowing for identifying the hidden function, and can be output on the output area of the first graphic object. The hidden function corresponding to the second graphic object may differ according to information output on the output area of the first graphic object.

Figure 4:
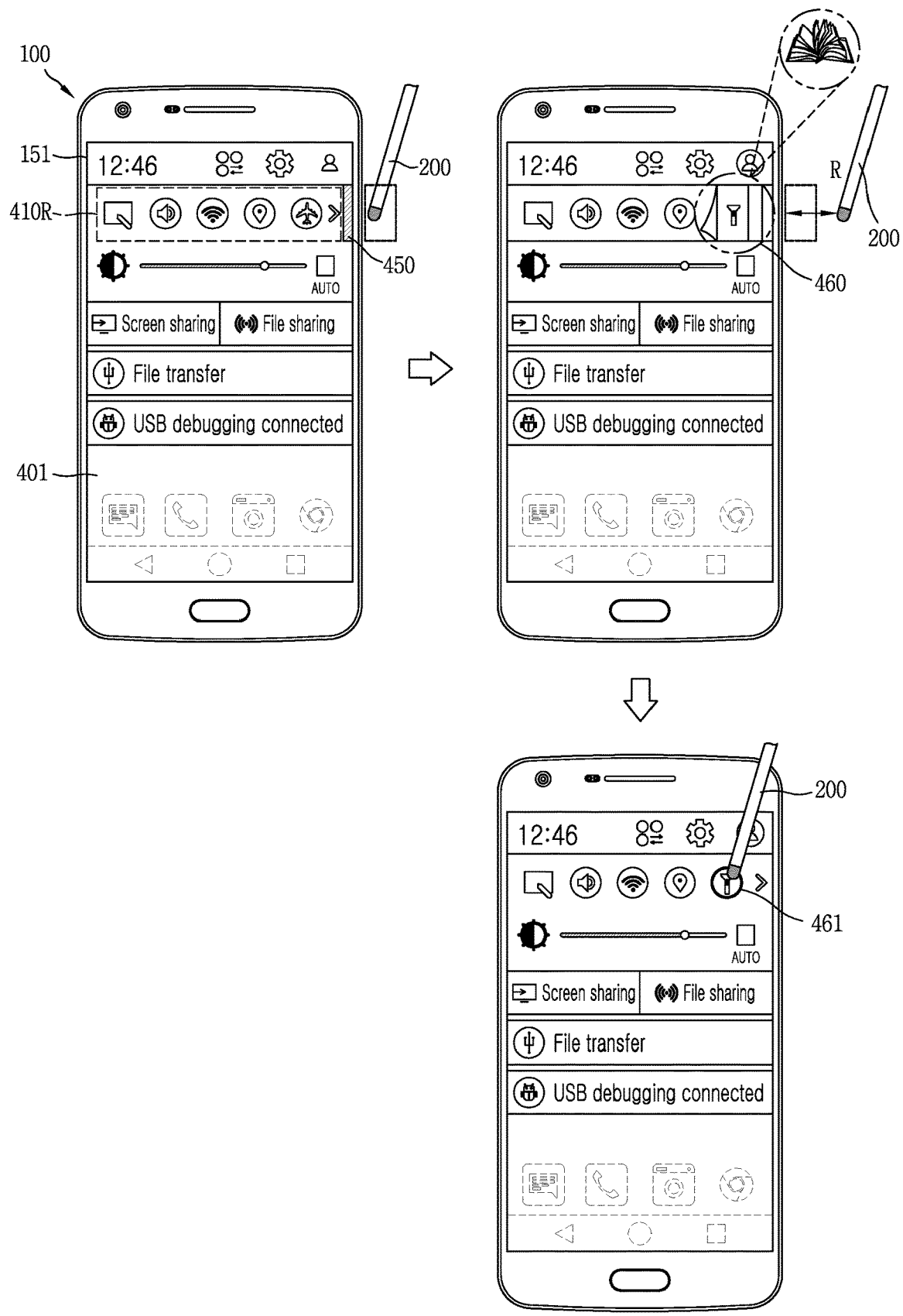
FIG. 4 is a conceptual view illustrating representative operations of a mobile terminal according to an embodiment of the present invention.

Next, FIG. 4 is a conceptual view illustrating representative operations of a mobile terminal according to an embodiment of the present invention. The touch screen 151 of the mobile terminal 100 can output thereon a specific content based on a user input. As a related example, as illustrated in FIG. 4, a notification screen 401 notifying an event generation can be output, in response to a touch input dragged down from an upper end of the touch screen 151.

In this state, when a touch is applied by the input device 200 having the magnetic field generating unit to an area outside the touch screen 151 near a side edge of the terminal body, the mobile terminal 100 can accurately recognize the spatial position of the input device 200 by detecting magnetic field values of the magnetic field generating unit through the plurality of three-axial magnetic sensors 143a and 143b.

In this instance, it is assumed that a touch point of the touch applied by the input device 200 is located within a range that the plurality of three-axial magnetic sensors can detect the magnetic field values of the magnetic field generating unit, namely, a range that the spatial position of the input device can be recognized.

Accordingly, a bar-like graphic object 450 is output on an edge area 410R of the touch screen 151. The user can visually check whether or not the spatial position of the input device 200 has accurately been recognized, by viewing the graphic object 450.

Under this state, when a predetermined time (e.g. 1 second) elapses, a second graphic object 460 which notifies a hidden function with respect to the corresponding edge area 410R, for example, a hidden function of a quick setting window, can be output. For example, a hidden setting icon (e.g., a torch icon) which is not currently output on the quick setting window can be output. In this instance, the bar-like graphic object 450 may disappear.

Next, when the spatial position of the input device 200 is moved in a direction (R) of moving away from (or moving close to) the side edge of the terminal body, for example, moved in the X-axial direction, the controller 180 can control a screen to open (output) sub menus of the hidden function, for example, other setting menus. In this instance, the sub menus may change with showing a visual effect like turning pages over, according to a degree that the input device 200 is pulled away from the side edge of the terminal body.

Also, when the spatial position of the input device 200 enters a side space of the area S2 or is moved close to an outer boundary of the reference range, the controller 180 can output a preset feedback signal, for example, a vibration, a notification sound, a visual effect and the like. This may allow the user to keep paying attention to performing an input of a desired control command within the reference range.

When a desired specific sub menu is output as an image of the second graphic object 461, the input device 200 can be brought into contact with or apply a proximity touch to (hover over) the output image, thereby fast executing a function of adding the specific sub menu onto the quick setting window. In addition, when the spatial position of the input device 200 is moved out of the reference range without selecting a desired specific sub menu, the controller 180 can control the hidden function of the quick setting window to disappear immediately.

Also, when the spatial position of the input device 200 is moved in the Y-axial direction or the input device 200 is lifted (to be out of the reference range) and then placed at another spatial position, the controller 180 can immediately output another function associated with information output on an edge area of the touch screen 151 corresponding to the moved position.

As described above, in the embodiments of the present invention, the spatial position of the input device can be accurately recognized merely by the plurality of the magnetic sensors provided in the mobile terminal 100 and the movement of the input device to another spatial position may be processed as an input of a different control command. In addition, only when the input device is moved to a specific spatial position, a hidden function associated with an area corresponding to the specific spatial position can be output. This may result in overcoming a limit in outputting menus and simplifying a complicated output form (style) of a display.

FIG. 5 is a flowchart illustrating the operations of the FIG. 4. First, the mobile terminal 100 according to an embodiment of the present invention detects a spatial position of the input device having the magnetic field generating unit using the plurality of three-axis magnetic sensors (S10).

In more detail, the three-axis magnetic sensors 143a and 143b may be disposed on portions of the touch screen 151 of the mobile terminal 100 near corners of one side of the touch screen 151, with being spaced apart from each other. The magnetic field generating unit 260 (see FIG. 2A), for example, a dipole magnet, generating the magnetic fields may be provided in an inner space of the input device 200.

A spatial position, an orientation and an angle of the input device 200 may be acquired by detecting a spatial position of the magnetic field generating unit 260 by measuring changed values of the magnetic fields through the plurality of three-axis magnetic sensors 143a and 143b. In this instance, degrees of freedom to the position and orientation of the magnetic field generating unit 260 may be expressed by calculating 5 variable values x, y, z, roll and pitch, namely, central positions (x, y and z) of the dipole magnet and rotational angles (roll and pitch) with respect to X' and Z' axes which are independent of the Y' axis.

Thus, upon using the plurality of three-axis magnetic sensors 143a and 143b, at least six magnetic field values (or magnetic field change values) may be acquired. Therefore, the position, orientation and angle of the magnetic field generating unit 260 having the five degrees of freedom can be specified relatively accurately.

When it is determined that the spatial position of the input device 200 is near an edge of the terminal body according to the detection result of the magnetic fields (or the changes in the magnetic field values), the controller 180 of the mobile terminal 100 outputs a first graphic object which notifies the detected spatial position on the touch screen 151 of the mobile terminal (S20). Here, an image of the first graphic object may be, as aforementioned, in a shape of a bar long in a lengthwise direction of the mobile terminal 100.

In this instance, the position of the bar may correspond to a position of the side edge area which has an X-axial value on the same line with a coordinate value of the detected spatial position of the input device 200. Also, the length of the bar may correspond to a width of each of dividable areas of a content currently output on the touch screen 151. For example, when the content currently output on the touch screen 151 is a recent call list, the length of the bar may be decided to correspond to a width of each call item of the list. Therefore, when the content output on the touch screen changes, the length of the bar may be differently adjusted.

When the first graphic object indicating the detected spatial position of the input device 200 is not output, the controller 180 can recognize that the spatial position of the input device 200 has been moved out of the reference range. In this instance, the user may allow the spatial position of the input device 200 to be recognized by moving the input device 200 to be closer to the side edge of the terminal body or moving the terminal body of the mobile terminal.

Next, when the spatial position of the input device is fixed for a predetermined time while the first graphic object is output, the controller 180 performs a step of outputting on the touch screen 151 a second graphic object which notifies a hidden function corresponding to the output area of the first graphic object (S30).

Here, the hidden function corresponding to the second graphic object may be decided based on information displayed on the output area of the first graphic object. Therefore, when any hidden function associated with the output information is not present, only the first graphic object may continuously be output event after the predetermined time. In this instance, when a hidden function is present at an adjacent area, the second graphic object may be replaced with notification information (e.g., an arrow image indicating an area where the hidden function is present) inducing a change or movement of the spatial position of the input device.

Also, the controller 180 can output another sub menu of a hidden function corresponding to a changing image while outputting the changing image on the second graphic object, based on a degree that the spatial position of the input device 200 is moved away from the side edge of the terminal body within the reference range. Here, the changing image may be a visual effect, for example, the image of the second graphic object being pulled opposite to the moving direction of the input device while gradually increasing in size.

Similar to this, when the spatial position of the input device 200 is moved close to the side edge of the terminal body within the reference range, a previously-output sub menu can be output again. Meanwhile, when the input device 200 is moved in a different direction from the previous direction, for example, in the Y-axial or Z-axial direction while the second graphic object is output, different processing corresponding to the detected moving direction through the plurality of three-axis magnetic sensors 143*a* and 143*b* may be executed. Various related embodiments will be described in more detail, hereinafter.

Next, FIGS. 6A to 18B are exemplary views illustrating examples of executing a hidden function based on a spatial position of an input device that moves near an edge of a terminal body, in a mobile terminal according to an embodiment of the present invention.

The controller 180 of the mobile terminal 100 according to an embodiment of the present invention can continuously detect a moving direction of the spatial position of the input device 200 based on magnetic fields of the magnetic field generating unit 260 detected by the plurality of three-axis magnetic sensors, while the second graphic object is output on an edge area of the touch screen 151. Also, the controller 180 can generate a different control command with respect to a hidden function corresponding to the second graphic object based on the detected moving direction.

Figure 6A:
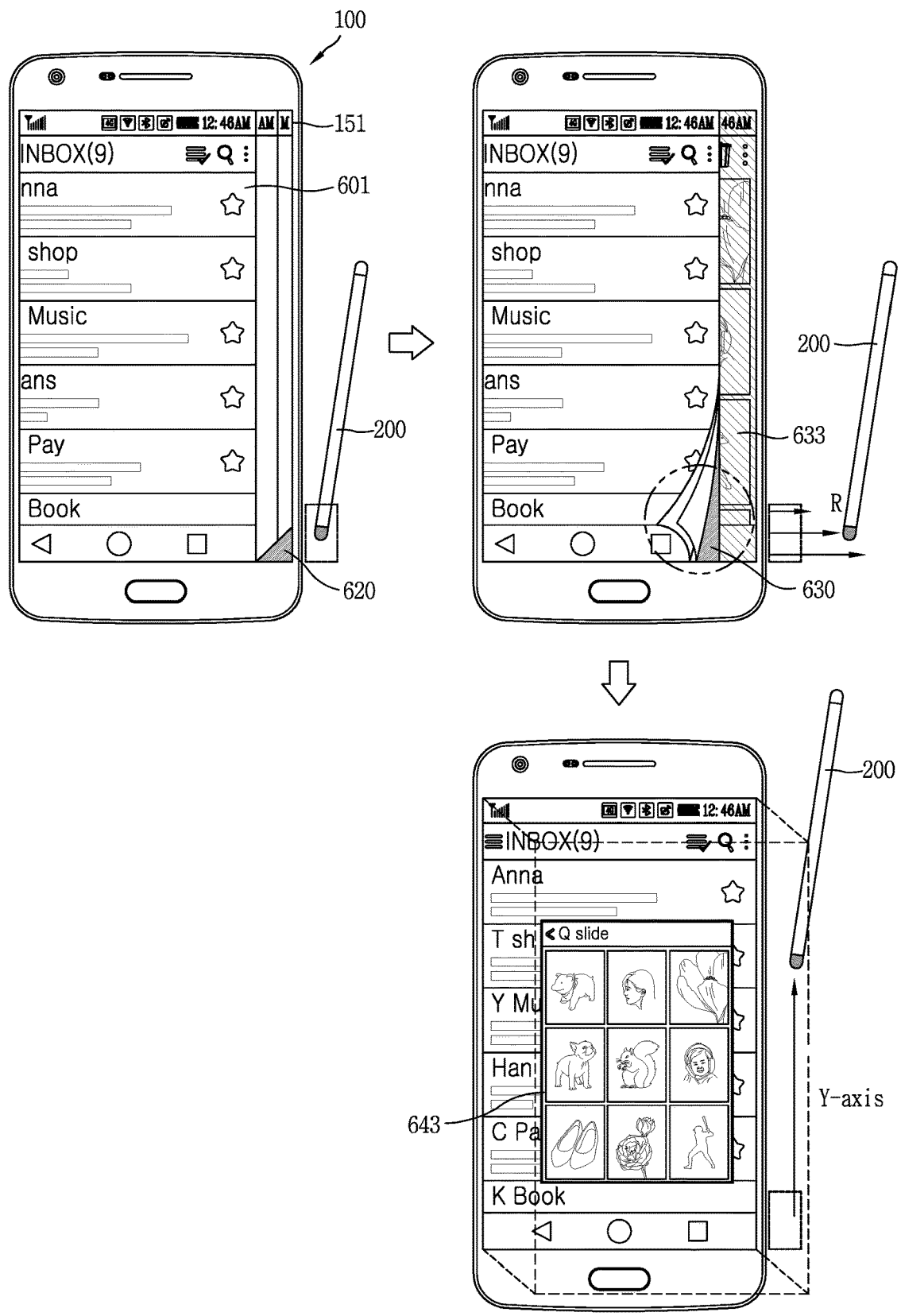
Figure 6B:
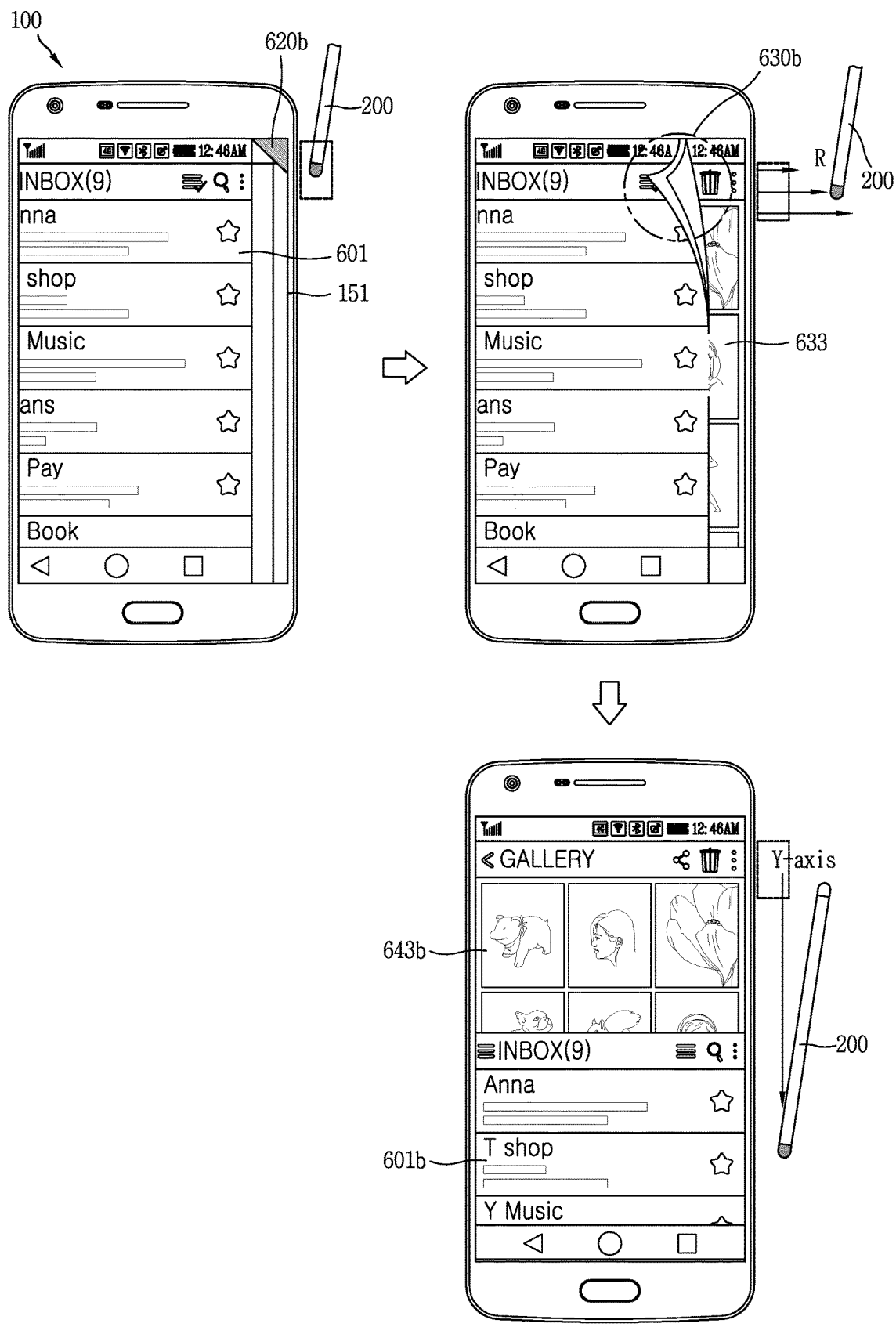

As one embodiment, FIGS. 6A and 6B illustrate examples of executing a function of fast accessing an execution screen of a lower-layered application by moving the spatial position of the input device 200 near an edge of 'side surface' (or 'side' edge) of the mobile terminal 100. First, as illustrated in FIGS. 6A and 6B, when a touch is applied by the input device 200 to a portion adjacent to a corner of a side surface of the mobile terminal 100 outside the touch screen 151, the plurality of magnetic sensors 143*a* and 143*b* can detect magnetic field values of the dipole magnet mounted in the input device 200, thereby recognizing the spatial position of the input device 200. Accordingly, a graphic object 620, 620*b* indicating the recognized spatial position can be output on a lower corner (FIG. 6A) or an upper corner (FIG. 6B), and a second graphic object viewing a lower-layered another screen, for example, an image 630, 630*b* that a corner portion of a displayed message list screen 601 is folded or rolled inwardly can be output.

In this state, when the input device 200 is pulled away from the side edge of the terminal body, a visual effect of turning pages over is output to correspond to a pulled degree, and simultaneously a part or icon of the lower-layered execution screen output on the second graphic object 630 or 630*b* is switched into a part or icon of another execution screen.

In the state that the part or icon of the execution screen desired to select is output on the second graphic object 630, 630*b*, when the spatial position of the input device 200 is moved in the Y-axial direction, namely, dragged up as illustrated in FIG. 6A or dragged down as illustrated in FIG. 6B, the selected execution screen can be popped up on a current screen in a shape of a floating window (FIG. 6B) or in a shape of a dual window (FIG. 6B).

Figure 6C:
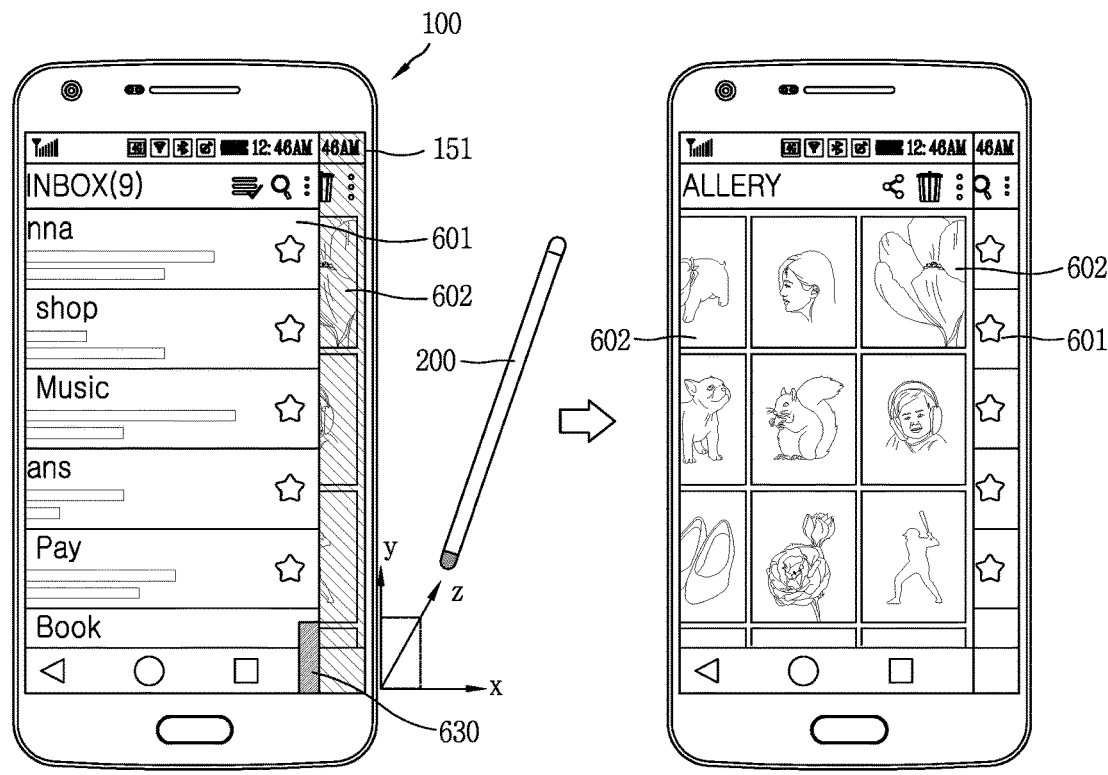

In this instance, in FIG. 6B, a size of a dual window screen 643*b* may differently be decided based on a degree that the spatial position of the input device 200 is moved in the Y-axial direction. As another embodiment, FIG. 6C illustrates an example of switching a current screen into an execution screen of a lower-layered specific application by moving the spatial position of the input device 200.

For example, when the spatial position of the input device 200 is detected near the corner of the side surface of the mobile terminal 100, an image 630 with a corner portion folded or rolled inwardly can be output as the second graphic object. In this instance, a part or icon of a lower-layered execution screen is output on the folded or rolled image. In this state, when the input device 200 is pulled up in the Z-axial direction, the displayed message list screen 601 is switched into a layer of the lower-layered picture list 602.

Figure 6D:
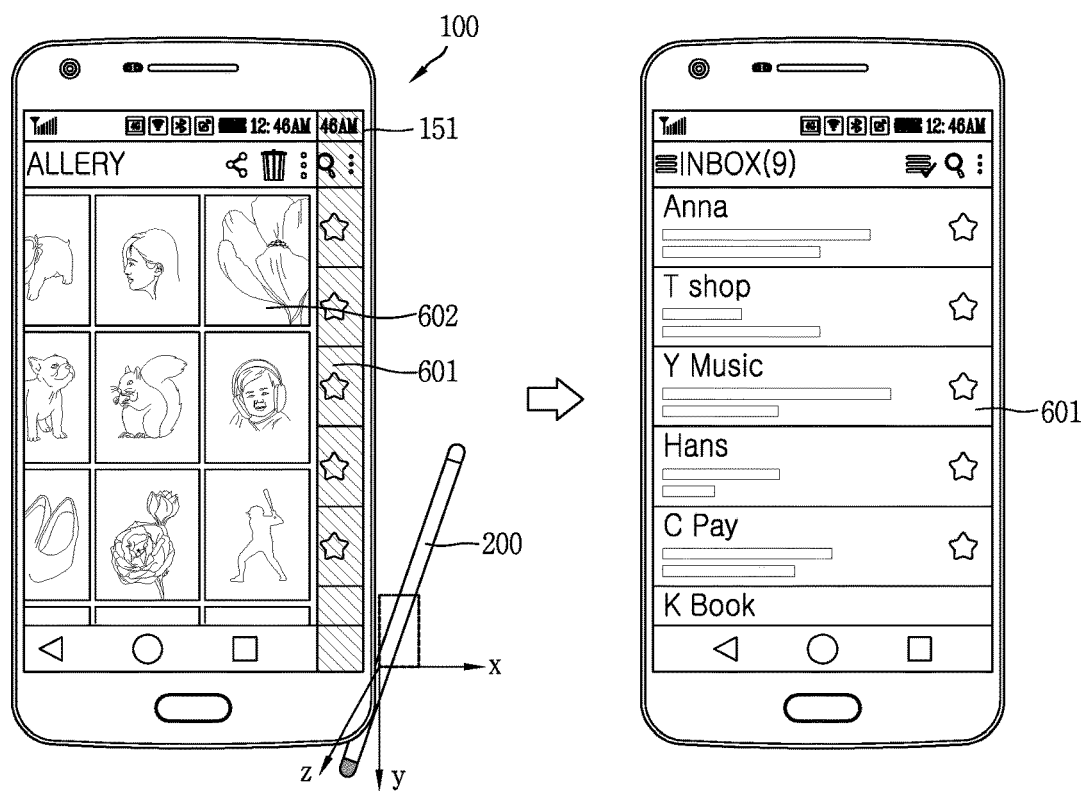

FIG. 6D illustrates an example of fast terminating an application corresponding to a currently-output execution screen by moving the spatial position of the input device 200. For example, when the input device 200 is pulled down in the Z-axial direction in the layer-switched state as illustrated in FIG. 6C, an execution of an application corresponding to the currently-output picture list 602 is immediately terminated. Accordingly, the lower-layered message list screen 601 is output again.

Meanwhile, when it is determined according to the detection result of the magnetic fields through the plurality of magnetic sensors that the spatial position of the input device 200 has been moved out of the reference range, the controller 180 can immediately terminate a currently-executed function. In this instance, a screen change corresponding to a previously-executed portion is maintained and the first and second graphic objects are not output any more on the touch screen 151.

Also, in order for the spatial position of the input device 200 to be continuously detected, the controller 180 can output a preset feedback signal before the spatial position of the input device 200 is moved out of the reference range when the current spatial position of the input device is located near an outer boundary of the reference range, namely, when the magnetic field values become very weak.

Figure 7A:
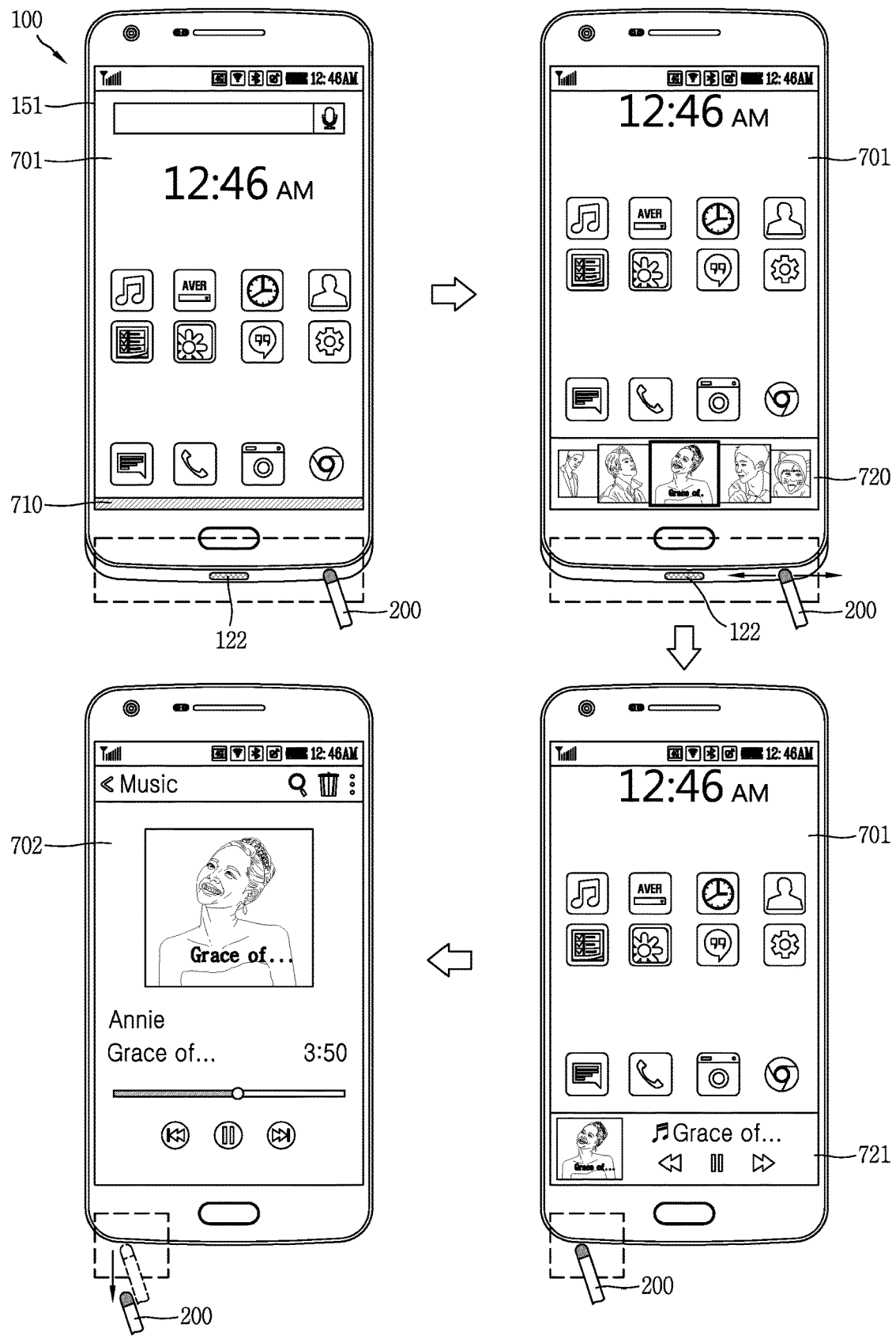
Figure 7B:
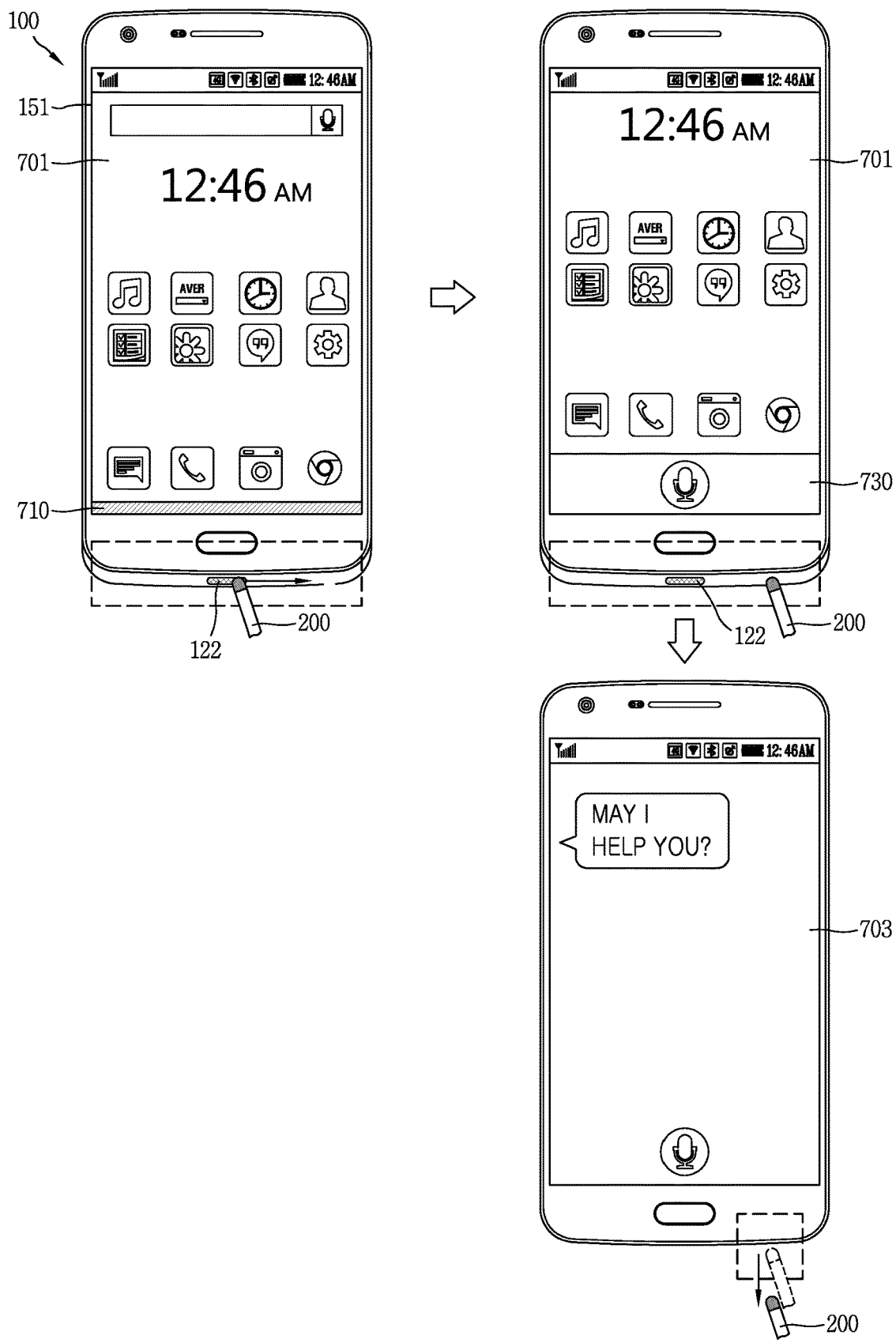

As another embodiment, FIGS. 7A and 7B illustrate examples of fast executing specific functions associated with a construction of the microphone 122 of the mobile terminal 100 by moving the spatial position of the input device 200 from a portion near an arranged position of the microphone 122, for example, near one end (e.g., a lower end) of the terminal body. That is, a hidden function may be decided by associating of a position of one component of the mobile terminal 100 with the spatial position of the input device 200. That is, here, a hidden function associated with a specific component is preferentially output, instead of information output on one area of the touch screen 151 corresponding to the spatial position of the input device 100.

First, as illustrated in FIG. 7A, when a home screen is output on the touch screen 151, when the spatial position of the input device 200 is detected near a lower end of the mobile terminal 100 where the microphone 122 is disposed, a graphic object 710 in a shape of a bar which long covers a lower edge of the touch screen 151 can be output.

When a predetermined time elapses, an area 720 for executing a media reproduction function can be output as the second graphic object on an output area of the graphic object 710. In this state, when the input device 200 is dragged to left or right or in the X-axial direction near the lower end of the mobile terminal 10, the controller 180 can execute a search mode associated with the media reproduction mode. Accordingly, a list of reproducible media can be output on the area 720, and a voice prompt for guiding a medium selection can be output.

In response to a selection of a desired medium, for changing a currently-reproduced medium into another reproduction medium, the input device may be pulled to a point corresponding to an area 721 where information regarding the currently-reproduced medium is output or the spatial position of the input device 200 may be moved near the point, thereby changing the currently-reproduced medium into another reproduction medium.

When the spatial position of the input device 200 is moved away from the one end where the microphone 122 is disposed in the search mode, the controller 180 can immediately execute an application associated with a media reproduction. Accordingly, as illustrated in FIG. 7A, an execution screen of the media reproduction application is output on the touch screen 151.

As another example, as illustrated in FIG. 7B, a voice recognition function instead of the media reproduction function may also be activated as another function associated with the microphone 122. Even in this instance, similar to the previous example, when the spatial position of the input device 200 is dragged in the X-axial direction, the voice recognition function may be activated, and an image object notifying the activated function is output adjacent to the microphone 122. Also, when the spatial position of the input device 200 is dragged away from the microphone 122, a voice recognition function application may immediately be entered.

Figure 8:
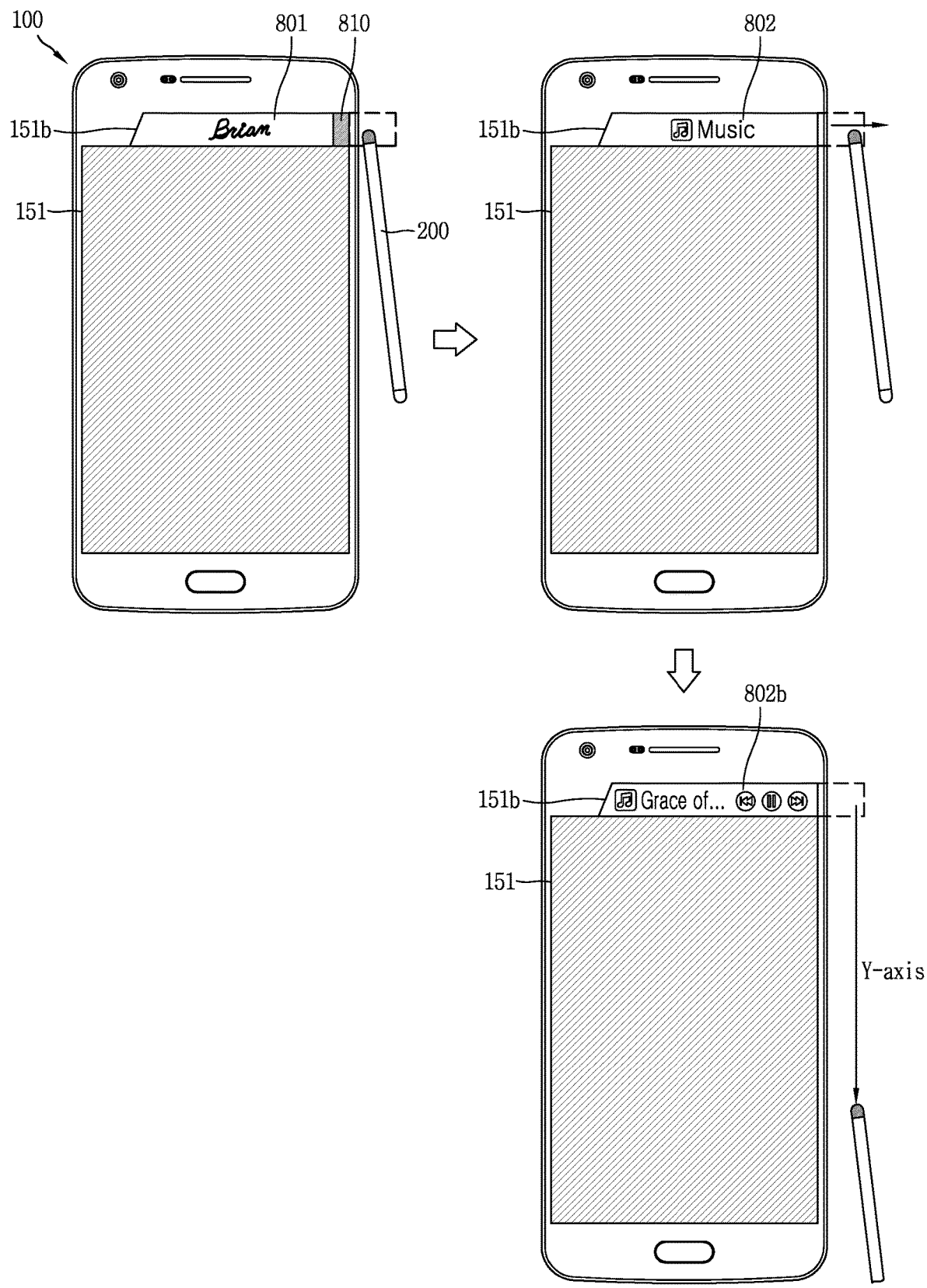

As another embodiment, in FIG. 8, when the touch screen 151 of the mobile terminal 100 is provided with an auxiliary screen area 151b which independently operates, information output on the auxiliary screen area 151b may fast change by moving the spatial position of the input device 200. For example, as illustrated in FIG. 8, when a specific signature 801 is output as preset information on the auxiliary screen area 151b in an off state of the touch screen 151, when the spatial position of the input device 200 is detected near an edge corresponding to the auxiliary screen area 151b, the preset information may be switched into another information, for example, music reproduction information 802. In this instance, another information may also be output according to a degree that the spatial position of the input device 200 is moved away from the auxiliary screen area 151b.

Figure 9:
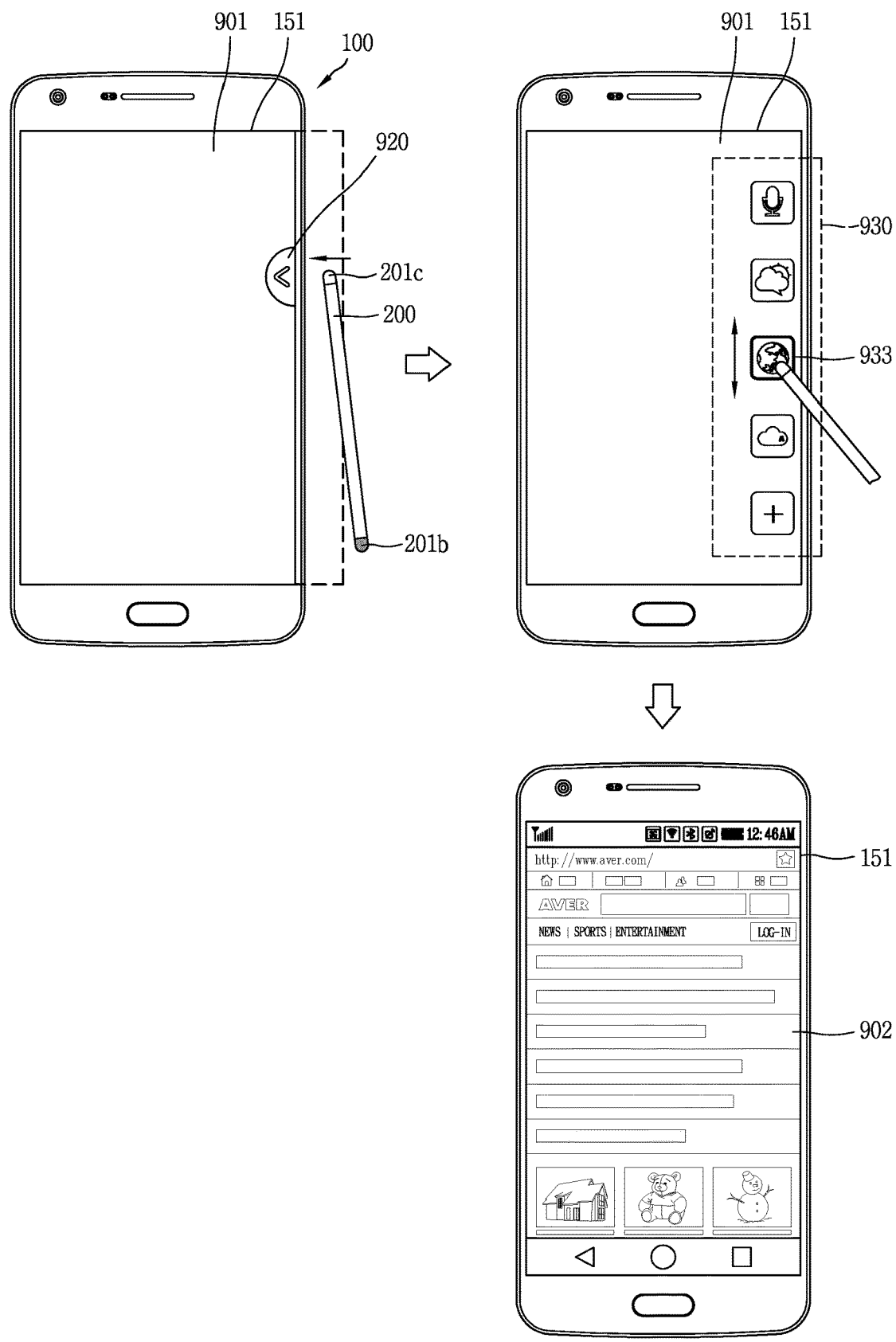

In the state that the music reproduction information 802 is output on the auxiliary screen area 151b, when the spatial position of the input device 200 is moved in the Y-axial direction, for example, a downward direction, a reproduction of the corresponding music may be executed while maintaining the off state of the touch screen 151. As another example, as illustrated in FIG. 9, directions of S-pole and N-pole of the magnetic field generating unit 260, namely, the dipole magnet disposed in the input device 200 may be switched with each other, which may allow for fast entering some applications at anytime.

For example, after one end portion 201b of the input device 200 is brought into contact with a floor near the terminal body of the mobile terminal 100, when another end portion 201c of the input device 200 is brought into contact with the floor by turning the input device 200 upside down, the plurality of magnetic sensors 143a and 143b provided in the mobile terminal 100 can recognize that the polar directions of the dipole magnet disposed in the input device 200 have been switched with each other. That is, the plurality of magnetic sensors 143a and 143b can recognize that the user has gripped the input device 200 upside down.

Thus, in the state that the switching of the polar directions of the dipole magnet has been detected in response to the another end portion 201c of the input device 200 touching a portion near the side edge of the touch screen 151, when a predetermined time is held, the controller 180 can output a handler image 920 notifying that a hidden function can be output may be displayed on an edge area of the touch screen 151 corresponding to the another end portion 201c. Afterwards, when a touch is applied to the handler image 920 or the spatial position of the input device 200 is fixed for a predetermined time, icons of preset applications are output on an edge area 930. Accordingly, the user can fast enter some applications even without releasing a lock state of the mobile terminal 100 and even without turning on the full touch screen 151.

Figure 10:
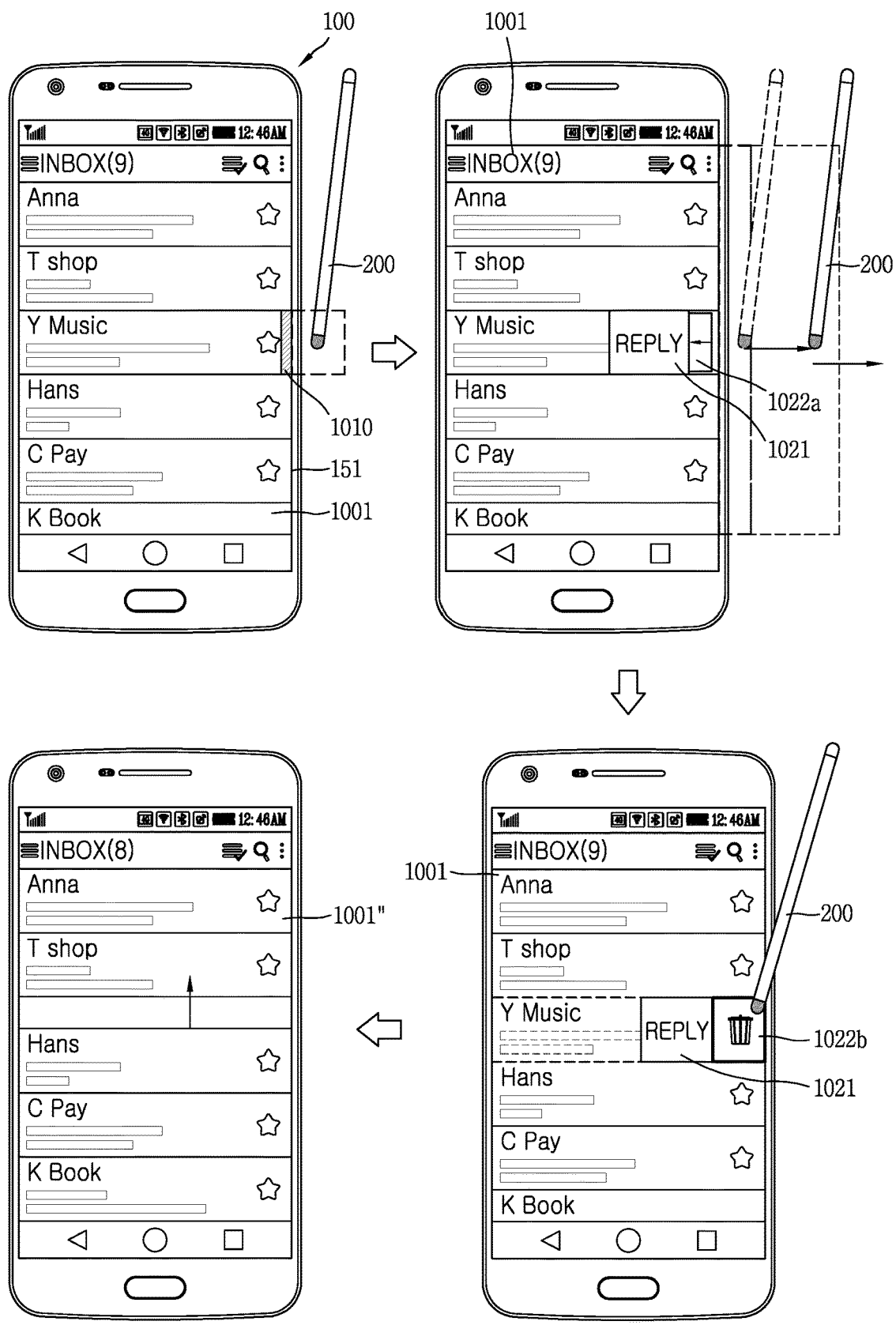
Figure 11:
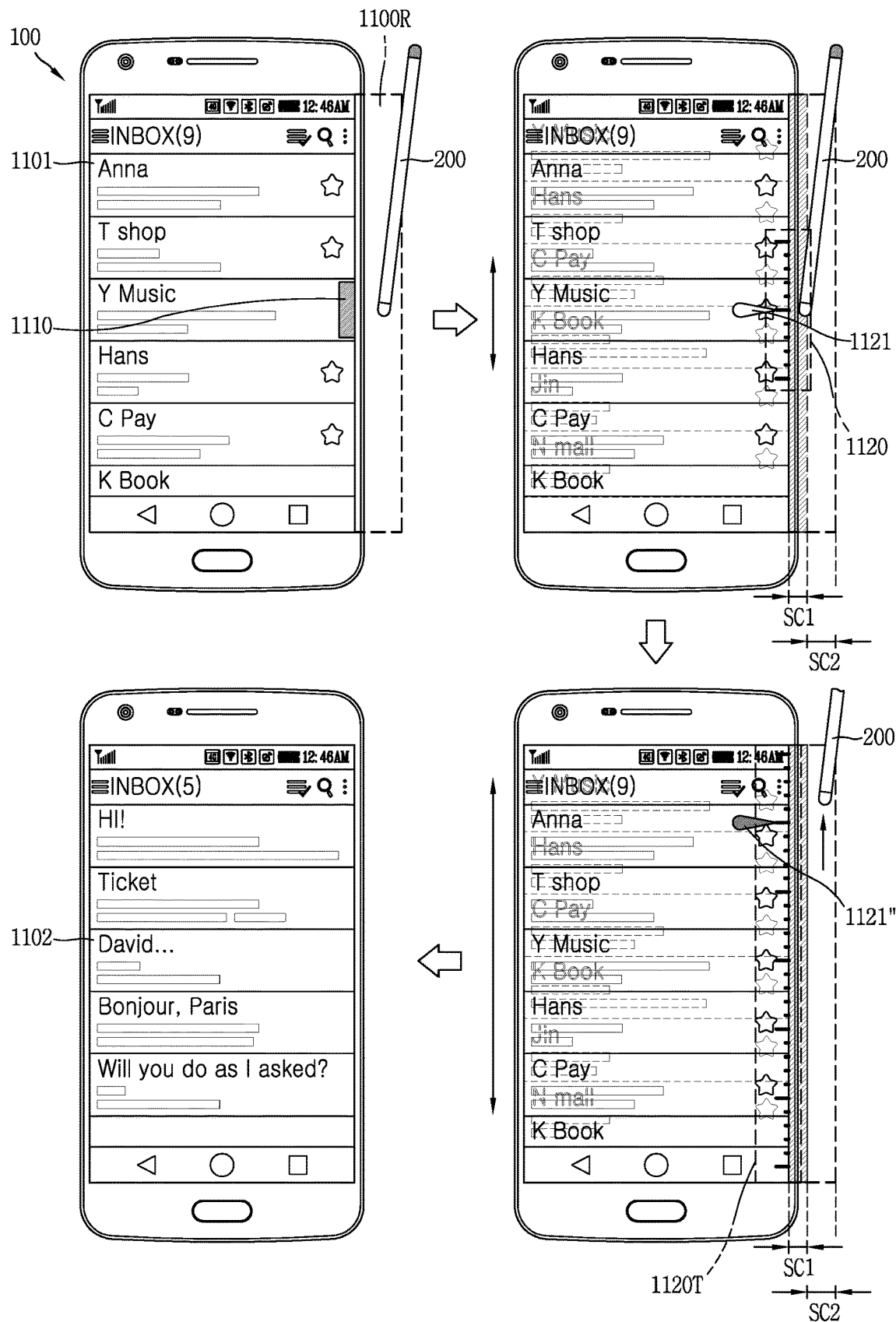

As another example, referring to FIG. 10, when a list 1001 including a plurality of items is output on the touch screen 151, a hidden edit function associated with some items may fast be executed by moving the spatial position of the input device 200. For example, when the spatial position of the input device 200 is detected adjacent to the side edge of the mobile terminal 100, a first graphic object 1010 in a shape of a bar can be output on an edge of an item corresponding to the spatial position. In this instance, when the spatial position of the input device 200 is moved, the first graphic object 1010 is moved to an edge of a corresponding another item. That is, the first graphic object 1010 is controlled in the unit of an item.

When the spatial position of the input device 200 is fixed for a predetermined time, a hidden edit function corresponding to an item is output. For example, a first edit icon 1021 for executing a response to the corresponding item is output together with a notification icon 1022a notifying that a different second edit icon can be output when the spatial position of the input device 200 is more moved. When the spatial position of the input device 200 is more moved away from the side edge of the mobile terminal 100, in response to the output of the notification icon 1022a, a second edit icon 1022b for executing a deletion of the item is output. In this state, when a touch is applied to the second edit icon 1022b, the item is deleted.

Meanwhile, an edition for a plurality of items may simultaneously be executed by adjusting a length of the first graphic object 1010 or the second edit icon 1022b. For example, in the state of touching the item with a hand or touching the second edit icon 1022b with a hand while the first graphic object 1010 is output, when the spatial position of the input device 200 is moved in the Y-axial direction, the length of the first graphic object 1010 or the second edit icon 1022b may extend to correspond to the moved degree in the Y-axial direction so as to obscure edges of a plurality of items. Afterwards, upon selecting a desired edit icon, the edition of the plurality of items which are partially obscured by the first graphic object 1010 or the second edit icon 1022b may simultaneously be executed.

As another embodiment, FIGS. 11 to 14 illustrate examples of providing a screen scroll function as a hidden function. First, referring to FIG. 11, when contents 1101 which are scrollable are output on the touch screen 151, when the spatial position of the input device 200 is fixed adjacent to the side edge of the terminal body of the mobile terminal 100 for a predetermined time, the controller 180 can switch a first graphic object 1110 notifying the spatial position of the input device 200 into a second graphic object, for example, a scale image 1120 notifying a screen scroll function. In this instance, an object 1121 notifying a current position of the displayed contents 1101 is output on the displayed scale image 1120.

In the state that the scale image 1120 is output on the side edge of the touch screen 151, when the spatial position of the input device 200 is moved to another position adjacent to the side edge, a screen may be scrolled up to an end point corresponding to the moved spatial position. In this instance, the direction of scrolling the screen is also decided according to the moved spatial position. For example, when the moved spatial position of the input device 200 is higher than the initial spatial position in the Y-axial direction, the scroll direction is decided as an upward direction.

Meanwhile, the screen scroll is executed at general speed while the spatial position of the input device 200 is detected within an area SC1 which is adjacent to the side edge. Further, when the spatial position of the input device 200 enters an area SC2 which is farther away from the side edge of the touch screen 151, the scale image is output on the full touch screen 151 (1120T) and the screen scroll becomes fast. As such, when the input device 200 enters the area SC2 in response to the change in the spatial position or the screen scroll is executed faster, a preset feedback signal may simultaneously be output.

Also, when the spatial position of the input device 200 is moved over the area SC2, the mobile terminal 100 can not recognize the spatial position of the input device 200 any more and the screen scroll is immediately stopped. The scale image 1220 or 1220T also disappears from the screen. As such, when the spatial position of the input device 200 is moved out of the reference range or a scrolled screen reaches a point corresponding to a moved spatial position, the screen scroll is stopped and a screen 1102) which is output at the stopped time point is maintained.

Figure 12:
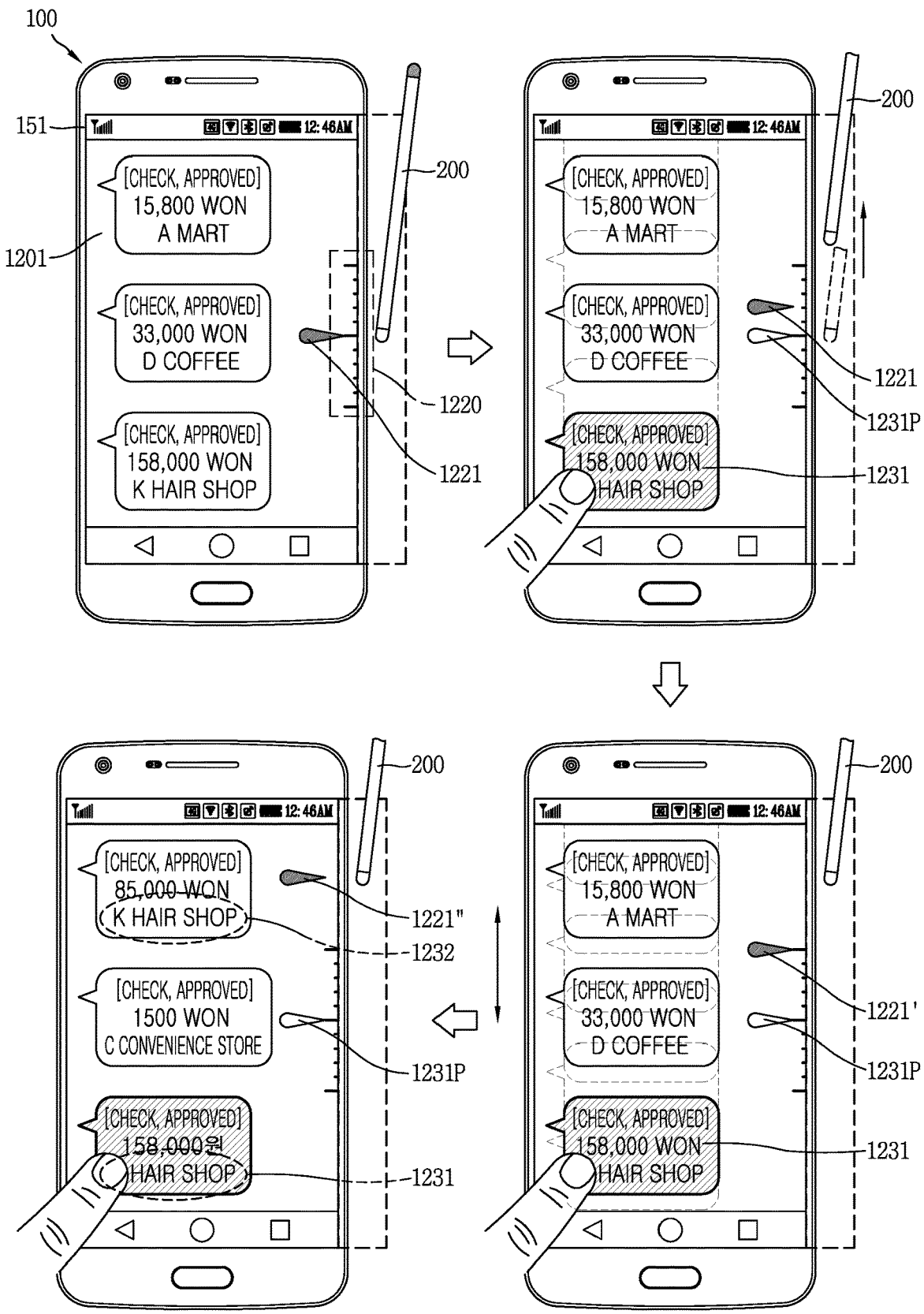
Figure 13:
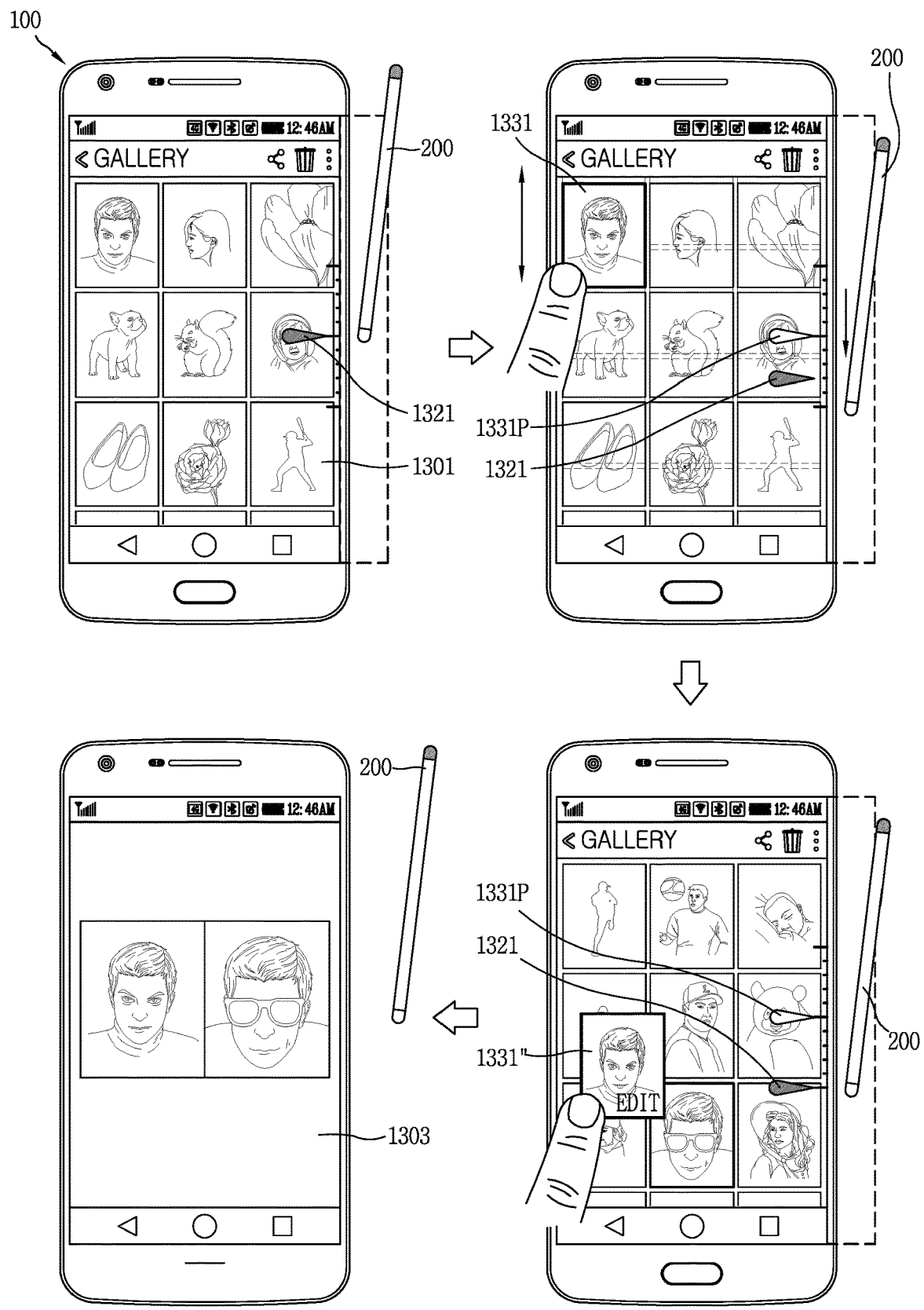

As another embodiment, FIGS. 12 to 13 illustrate detailed examples related to restricting a screen scroll with respect to a specific object. In FIG. 12, when the second graphic object, for example, the scale image 1220 notifying a hidden function is output on the side edge of the touch screen 151, the controller 180 can recognize a touch input applied to an object, for example, a specific message 1231 output on the touch screen 151.

In this state, when a scroll end point is selected in response to the spatial position of the input device 200 being moved in the Y-axial direction, the message 1231 with the touch input applied thereto is popped up and thereby the screen scroll is restricted. In this instance, when the touch input applied to the message 1231 is released, the screen scroll is immediately applied even to the message 1231.

Also, while scrolling the screen, on the displayed scale image 1220 or 1220T can be output at least part of a first object 1221 notifying a position of a current screen, a second object 1231P notifying an output position of the selected message 1231, and a third object (not illustrated) notifying the moved spatial position of the input device. In addition, the controller 180 can extract a keyword from information output on the selected message 1231. The controller 180 can detect information including the keyword while the screen is scrolled, to reduce a scroll speed at the corresponding position or generate a brake signal for a predetermined time. Accordingly, even though the screen is fast scrolled, the user can check all of other messages associated with the selected message 1231.

Also, in the state that the screen scroll is stopped or terminated based on the spatial position of the input device, namely, in case where the spatial position of the input device 200 is moved out of the reference range or the position of the scrolled screen reaches the moved spatial position, the controller 180 can execute an edit mode with respect to a previously-selected object and a newly-selected specific object ('second object') when a touch input applied to the previously-selected object is dragged into an area of the newly-selected specific object on the current screen.

As a related example, as illustrated in FIG. 13, as a picture image 1331 selected before scrolling the screen is pulled into an area of another picture image of a picture list displayed after terminating the screen scroll, when the two images overlap each other by exceeding a predetermined range (e.g., more than a half of an image size), the two images are merged into a new image 1303.

Figure 14:
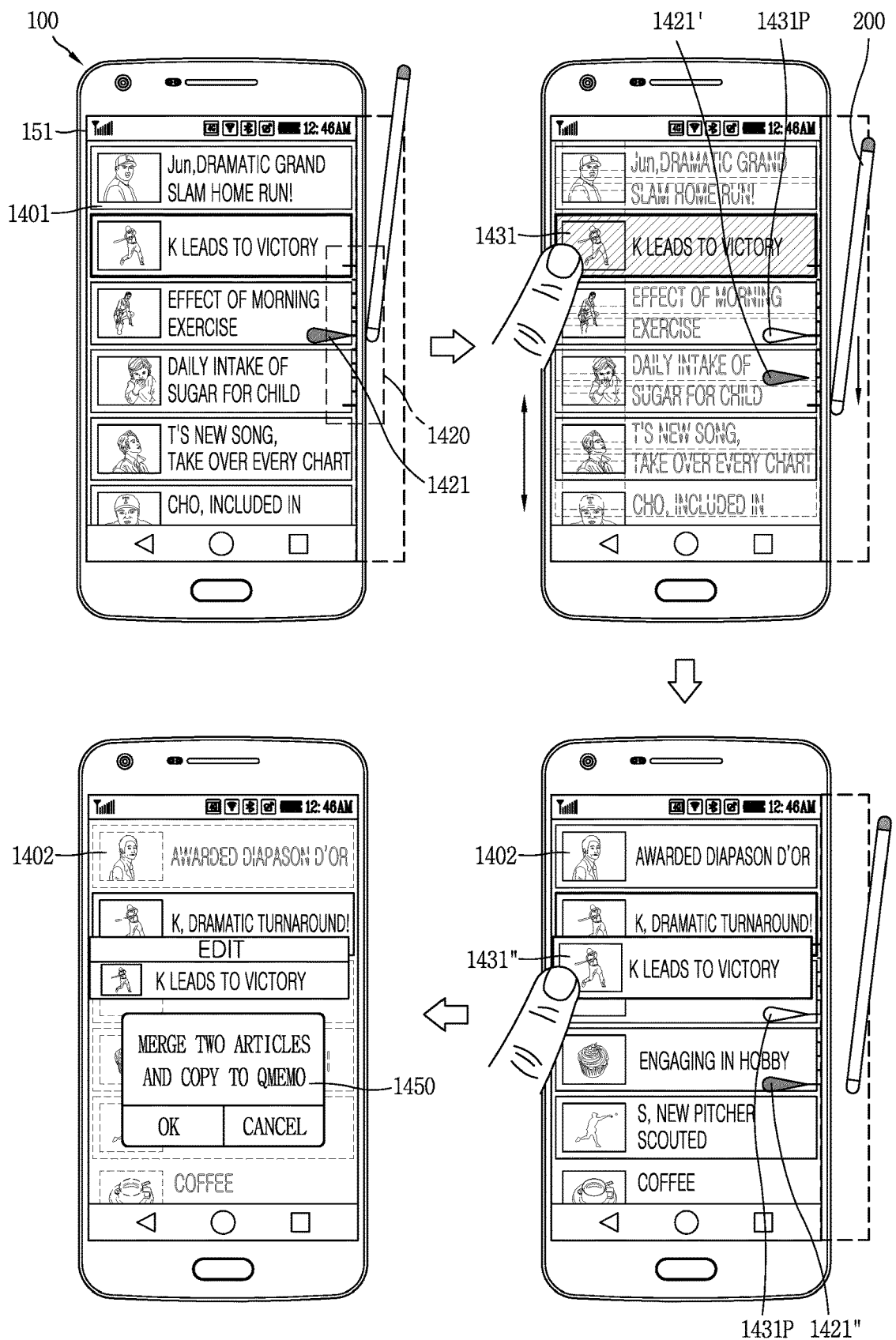

Or, as illustrated in FIG. 14, when a specific article item 1431 selected before scrolling the screen is pulled to another article item which is displayed after terminating the screen scroll, a popup window 1450 for checking whether or not to save contents of the two article items at once may be displayed.

Figure 15:
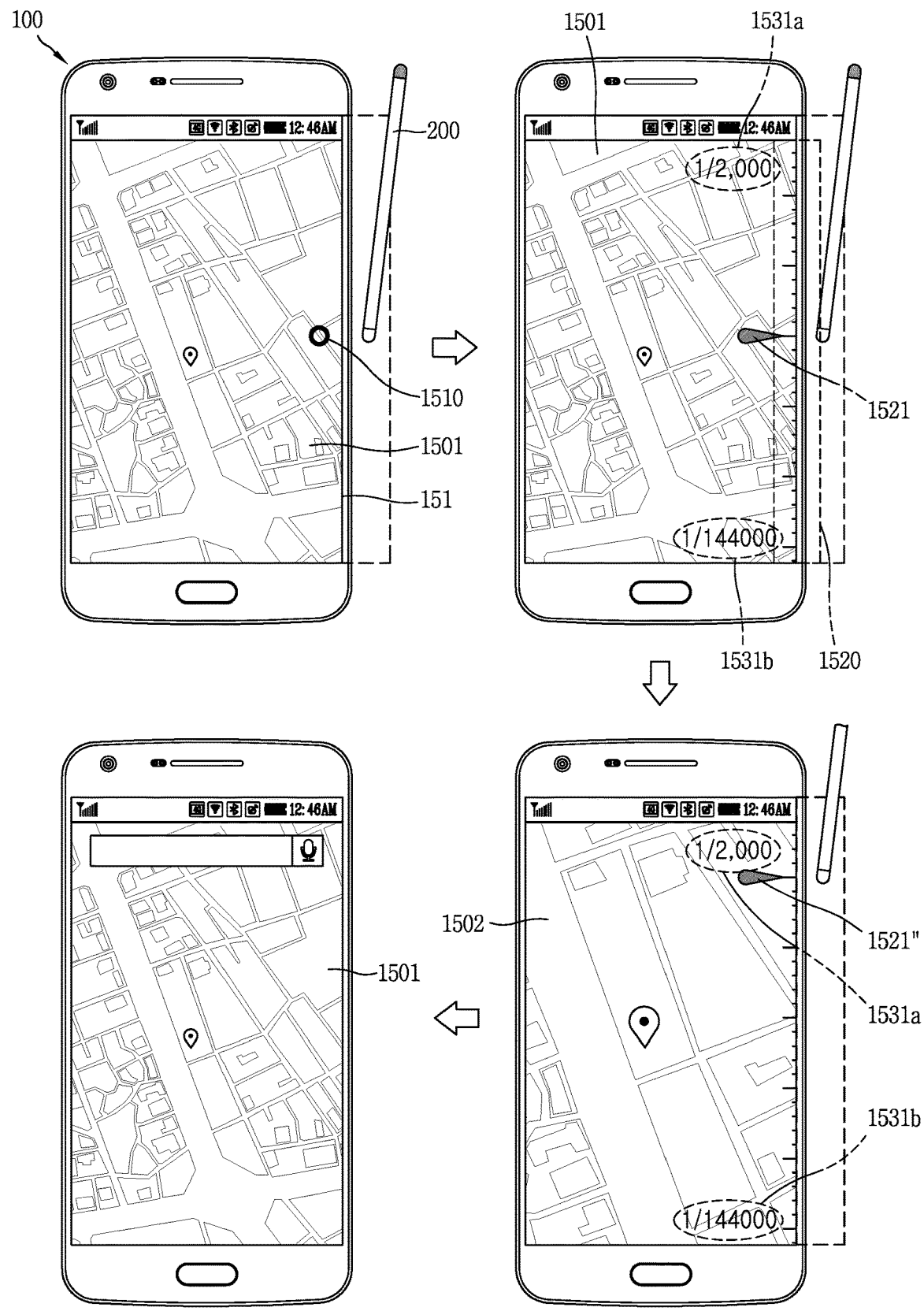

As another example, FIG. 15 illustrates an example in which the spatial position of the input device 200 is detected adjacent to the side edge of the terminal body of the mobile terminal 100 when a map screen 1501 is output on the touch screen 151. In this example, when a first graphic object 1510, for example, a ring image notifying the detected spatial position is output, the input device 200 is fixed at the corresponding spatial position for a predetermined time (e.g., 1 second).

Here, that the spatial position of the input device 200 is fixed refers to a case where changes in the magnetic field values detected through the plurality of magnetic sensors are rarely detected after the spatial position is detected, or as less as insignificant because of a detection of only an environmental magnetic field change.

As such, when the spatial position of the input device 200 is fixed, a scale image 1520 similar to that illustrated in FIG. 12 can be output as the second graphic object and simultaneously a minimum scale value 1531a and a maximum scale value 1531b can be output on upper and lower ends of the screen. Afterwards, when the spatial position of the input device 200 is moved in the Y-axial direction, a scale value corresponding to the moved position is selected between the minimum scale value 1531*a* and the maximum scale value 1531*b*. Accordingly, the initial map screen 1501 is zoomed in/out to correspond to the selected scale value.

In this instance, an object notifying the selected scale value, namely, the moved spatial position of the input device 200 is output on the scale image 1520. When the spatial position of the input device 200 is moved out of the reference range, the scale image 1520 disappears and the initial map screen 1501 is output again.

Figure 16A:
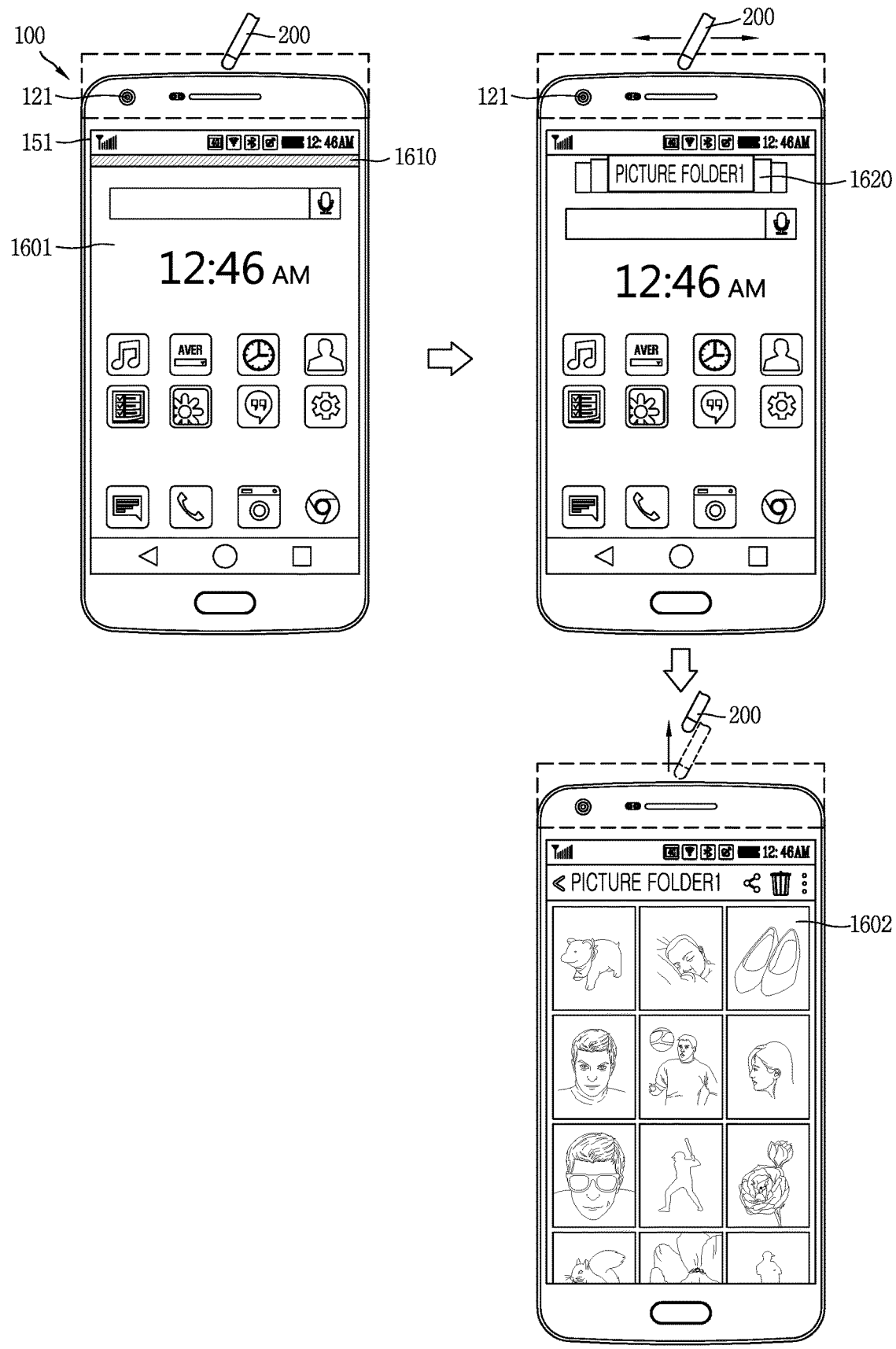
Figure 16B:
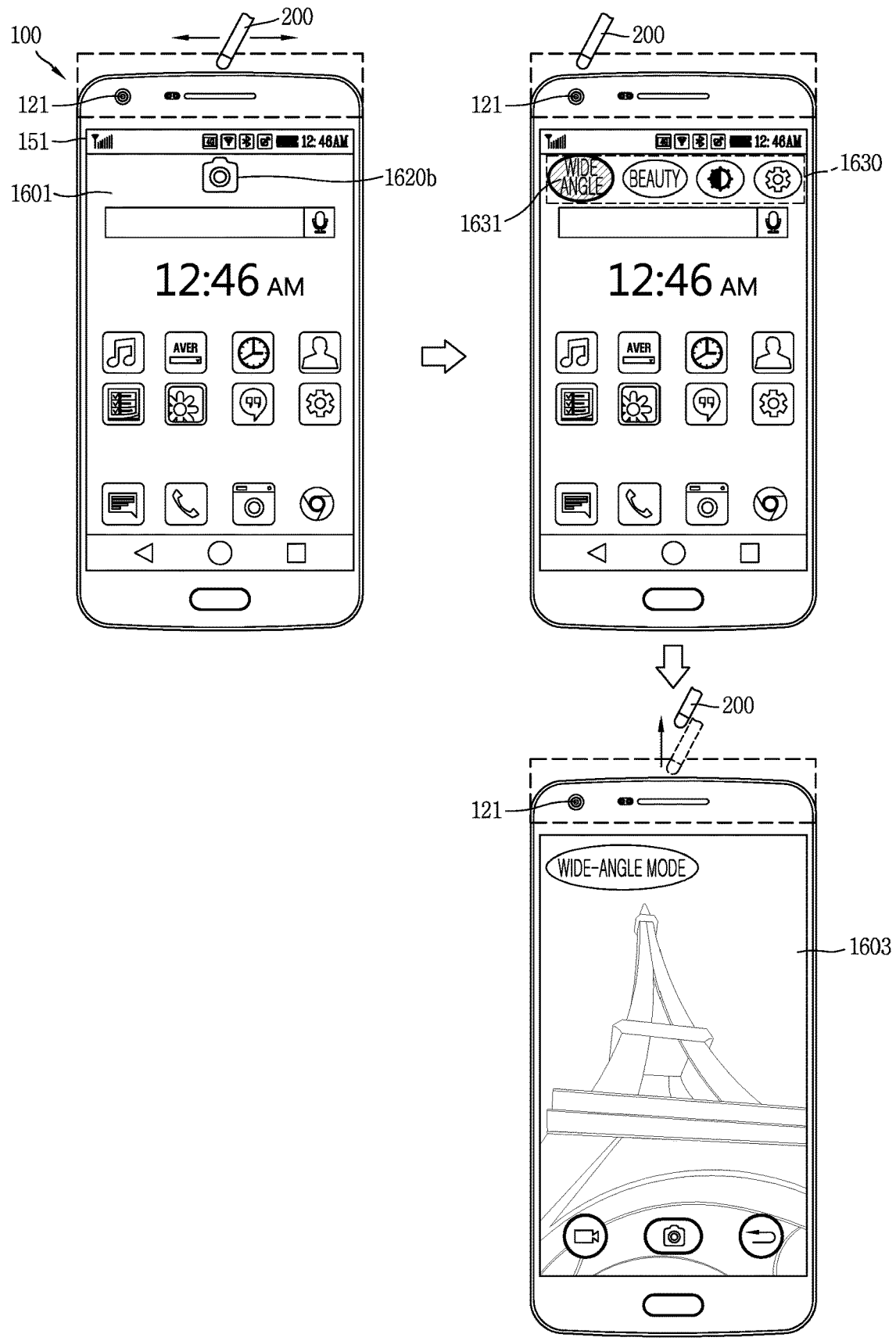

As another example, FIGS. 16A and 16B illustrate examples of outputting and executing a hidden function associated with the camera 121 of the mobile terminal 100 when the spatial position of the input device 200 is detected adjacent to another end of the mobile terminal 100, for example, an upper end of the mobile terminal 100, on which the camera 121 is disposed.

For example, when the spatial position of the input device 200 is detected adjacent to the camera 121 disposed on the upper end of the mobile terminal 100, as illustrated in FIG. 16A, a bar-like graphic object notifying the spatial position may be displayed on an upper end of the touch screen 151 and then a preset picture folder 1620 may be displayed on an upper area of the touch screen 151 after a predetermined time. Or, as illustrated in FIG. 16B, a function setting window of the camera 121 may first be output. Afterwards, the spatial position of the input device 200 may be moved in the X-axial direction and fixed there for a predetermined time. Accordingly, a desired icon 1631 may be selected from a plurality of icons output on the function setting window.

As such, after a desired picture folder or a camera function is set, when the spatial position of the input device 200 is moved away from the upper end of the terminal body of the mobile terminal 100, a corresponding application may fast be executed in the set state of the picture folder or camera function. That is, an associated application can enter in an executed state of a specific step.

Figure 17:
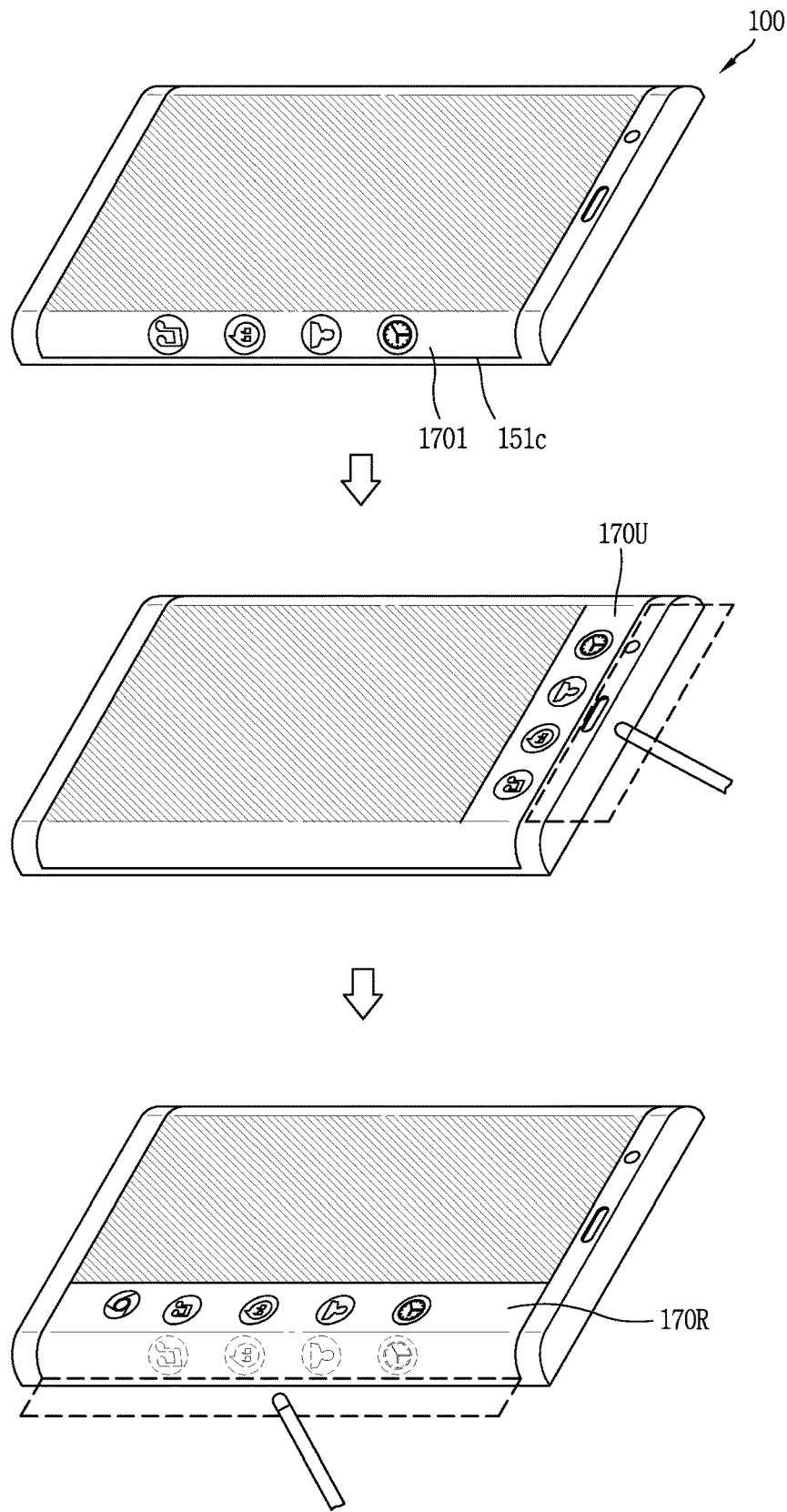

As another example, FIG. 17 illustrates an example of moving specific information by using the spatial position of the input device 200 when the specific information is output on a side display area 151*c* in an off state of the touch screen 151 having the side display area 151*c*.

The side display area 151*c* has a curvature in terms of a characteristic of the shape of the mobile terminal 100. Therefore, when the terminal body is laid on the floor, it may be difficult to check information output on the side display area 151*c* at one view according to the user's viewing angle.

Accordingly, in the present invention, when the spatial position of the input device 200 is detected near an edge of the terminal body in the off state of the main display area 151, namely, the touch screen, the controller 180 can move information output on the side display area 151*c* to an edge of the main display area 151 corresponding to the detected spatial position and output the information on the moved position.

For example, as illustrated in FIG. 17, when the spatial position of the input device 200 is detected adjacent to an upper end of the terminal body of the mobile terminal 100, icons 1701 of applications may be moved to an upper edge of the touch screen 151 (170U). When the spatial position is detected adjacent to a right edge of the terminal body, the icons 1701 of the applications may be moved (171R) to a right edge of the touch screen 151 for output (170R). As such, after only a part of the main display area 151 is switched into an active state, when the spatial position of the input device 200 is moved out of the reference range, the activated part of the main display area 151 may then be switched back into an inactive state (screen-off state).

Figure 18A:
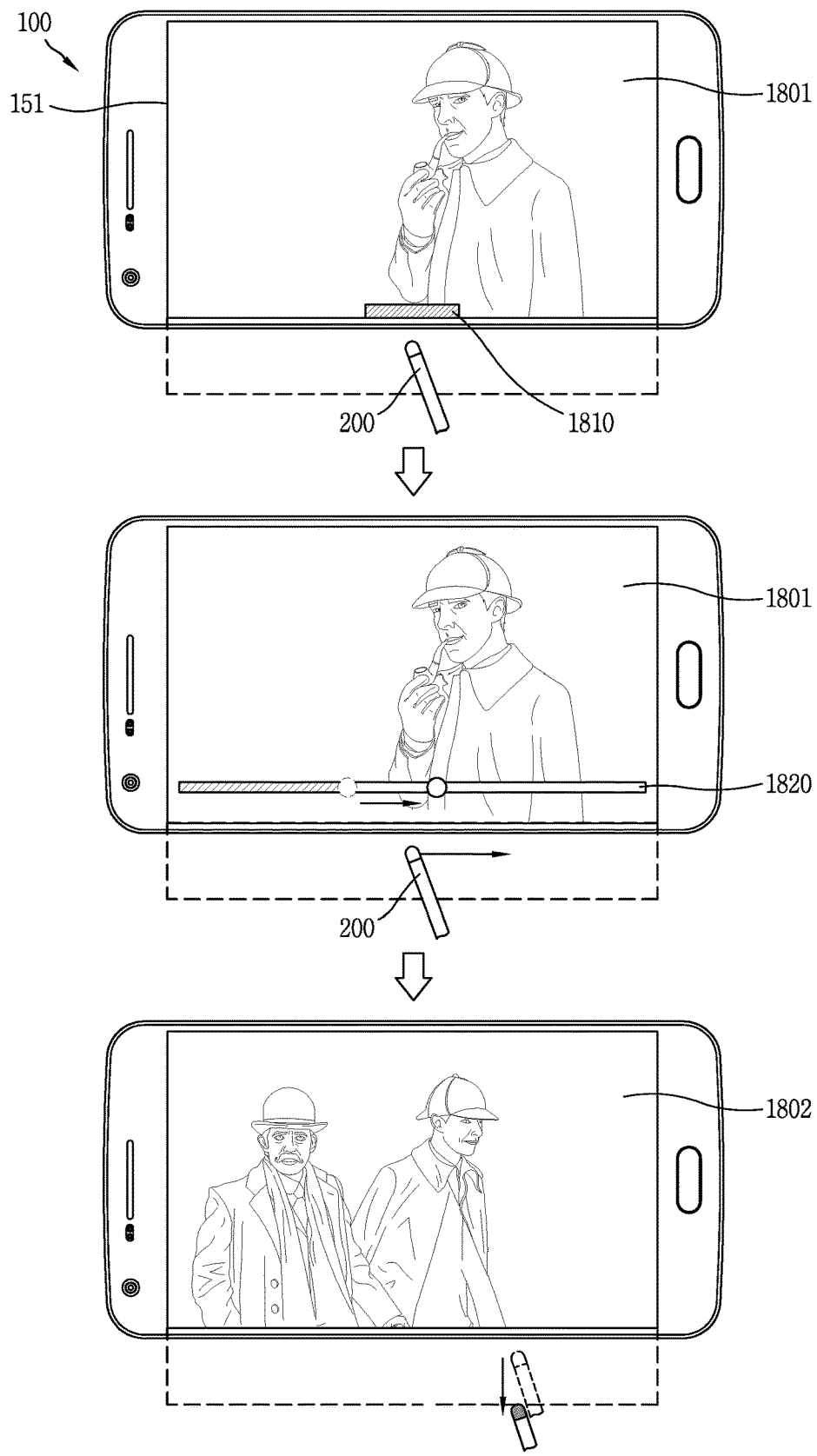

As another embodiment, as illustrated in FIGS. 18A and 18B, while a reproduction video 1801 is output on the full touch screen 151, a hidden function may fast be executed by moving the spatial position of the input device 200. For example, when the touch screen 151 is laid in a horizontal (landscape) direction, when the spatial position of the input device 200 is detected adjacent to a lower edge of the touch screen 151, a bar-like first graphic object 1810 may be switched into a reproduction bar ('second graphic object') 1820 for changing a reproduction position. When the spatial position of the input device 200 is moved in the X-axial direction to select a desired reproduction time point on the reproduction bar 1820 and then moved away from the terminal body, the reproduction is restarted after moving to the selected reproduction time point. Or, in the state that the touch screen 151 is laid in the horizontal (landscape)direction, when the spatial position of the input device 200 is detected adjacent to a right (or left) edge of the touch screen 151, a second graphic object 1830 for adjusting a reproduction speed can be output as a hidden function.

Meanwhile, the aforementioned example has been described under assumption that the spatial position of the input device 200 is detected adjacent to the right edge of the mobile terminal 100, but the present invention may not be limited to this. That is, the same/like operations as those illustrated in the aforementioned example may also be executed adjacent to a left edge, other than the right edge, of the mobile terminal 100. Also, according to the direction, the mobile terminal 100 can recognize whether the user gripping the input device 200 is a left-handed person or a right-handed person.

Also, those embodiments have been described based on the front surface where the touch screen 151 of the mobile terminal 100 is disposed, but as aforementioned, the reference range in which the spatial position of the input device 200 is recognizable may also be equally or similarly applied to the rear surface of the mobile terminal 100.

As described above, in the present invention, a spatial position of an input device can accurately be recognized merely by a plurality of three-axis magnetic sensors provided in a mobile terminal, and the recognized spatial position of the input device can be processed as inputs of various control commands. Also, a hidden function with respect to an area of a specific position can be output only when the input device is moved to the specific position, which may result in overcoming a limit on outputting menus and simplifying a complicated output form (style) of a display. In addition, since the input device does not have to be brought into contact with the display, a problem that a screen is obscured by the input device and a hand holding the input device during an execution of an input can be minimized.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body;
a touch screen;
a plurality of magnetic sensors configured to detect a spatial position of an input device having a magnetic field generating unit when an input is applied by the input device to an area outside the touch screen; and
a controller configured to:
recognize the spatial position of the input device by detecting magnetic field values of the magnetic field generating unit through the plurality of magnetic sensors without contacting the touch screen,
display a content screen on the touch screen,
display a first graphic object on an area of the touch screen corresponding to the recognized spatial position,
display a second graphic object notifying a function with respect to information displayed on a displayed area of the first graphic object on the area of the touch screen when the recognized spatial position of the input device is fixed for a first predetermined time,
display a different sub menu of the function based on a degree that the spatial position of the input device is moved away from the terminal body within a reference range or is moved close to the terminal body within the reference range,
execute a specific sub menu of the function corresponding to the second graphic object when the spatial position of the input device is moved away from the terminal body outside the reference range, while the specific sub menu is displayed,
in a state that one portion of the input device is recognized, detect a switching of polar directions of a dipole magnet disposed in the input device in response to another end portion of the input device touching a portion of the terminal body near a side edge of the touch screen,
display a handler image notifying that icons of preset applications are output on an edge area of the touch screen based on detecting the switching of the polar directions of the dipole magnet, and
display the icons of the preset applications on the edge area of the touch screen when a touch is applied to the handler image or the spatial position of the input device is fixed for a second predetermined time.

2. The terminal of claim 1, wherein the controller is further configured to decide the function corresponding to the second graphic object based on information displayed on the displayed area of the first graphic object.

3. The terminal of claim 1, wherein the controller is further configured to move at least one of the first and second graphic objects in response to the input device being moved to another region outside the touch screen when the at least one of the first and second graphic objects is displayed.

4. The terminal of claim 1, wherein the controller is further configured to:
detect a moving direction of the spatial position of the input device based on magnetic fields of the magnetic field generating unit detected by the plurality of magnetic sensors, while the second graphic object is displayed, and
generate a different control command with respect to the function corresponding to the second graphic object based on the detected moving direction.

5. The terminal of claim 4, wherein the controller is further configured to execute the function corresponding to the second graphic object in response to the second graphic object being pulled in a second direction different from a first direction, when the spatial position of the input device is moved in the first direction of moving away from the terminal body within the reference range while the second graphic object is displayed.

6. The terminal of claim 5, wherein the controller is further configured to execute the function corresponding to the second graphic object and display an execution result on the touch screen, in response to the spatial position of the input device being moved in the second direction, different from the first direction, within the reference range while the second graphic object is displayed.

7. The terminal of claim 5, wherein the controller is further configured to stop displaying the first and second graphic objects and stop executing the function when the spatial position of the input device is moved out of the reference range.

8. The terminal of claim 1, further comprising:
a microphone disposed on the terminal body,
wherein the controller is further configured to:
display a bar on the content screen as the first graphic object when the spatial position of the input device is recognized where the microphone is disposed at an outside of the touch screen and without contacting the touch screen,
display an area notifying a voice recognition function on the content screen as the second graphic object when the recognized spatial position of the input device is fixed for the first predetermined time, and
activate the microphone and the voice recognition function when the spatial position of the input device is moved away from the terminal body outside the reference range in a predetermined direction while the second graphic object is displayed.

9. The terminal of claim 8, wherein the controller is further configured to execute an application associated with the voice recognition function when the spatial position of the input device is moved away from the terminal body outside the reference range.

10. The terminal of claim 1, wherein the controller is further configured to:
switch the first graphic object into a third graphic object notifying a screen scroll function when the spatial position of the input device is moved out of the touch screen and fixed outside the terminal body for a third predetermined time, and
execute the screen scroll ended at a point corresponding to a moved spatial position when the spatial position of the input device is moved away from the terminal body outside the reference range.

11. The terminal of claim 10, wherein the controller is further configured to adjust a scroll speed of the screen scroll based on a degree that the spatial position of the input device is moved away from the terminal body within the reference range.

12. The terminal of claim 10, wherein the controller is further configured to restrict the screen scroll with respect to at least one of objects output on the touch screen when a touch input is applied to the at least one object while the third graphic object notifying the screen scroll function is displayed.

13. The terminal of claim 12, wherein the third graphic object notifying the screen scroll function includes thereon at least part of a position of a current screen, the moved spatial position of the input device and a position of the touch input applied to a first object, while the screen scroll is executed.

14. The terminal of claim 13, wherein the controller is further configured to execute an edit mode for the first object and a second object when the touch input applied to the first object is dragged to an area of the second object included in the current screen, when the screen scroll is stopped or terminated based on the spatial position of the input device.

15. A method of controlling a mobile terminal having a terminal body, the method comprising:
- detecting, via a plurality of magnetic sensors, a spatial position of an input device having a magnetic field generating unit when an input is applied by the input device to an area outside the touch screen;
- displaying, via a controller, a content screen on a touch screen of the mobile terminal;
- recognizing the spatial position of the input device by detecting magnetic field values of the magnetic field generating unit, through the plurality of magnetic sensors, without contacting the touch screen;
- displaying, via the controller, a first graphic object on an area of the touch screen corresponding to the recognized spatial position;
- displaying, via the controller, a second graphic object notifying a function with respect to information displayed on a displayed area of the first graphic object on an edge area of the touch screen when the recognized spatial position of the input device is fixed for a first predetermined time;
- displaying a different sub menu of the function based on a degree that the spatial position of the input device is moved away from the terminal body within a reference range or is moved close to the terminal body within the reference range;
- executing a specific sub menu of the function corresponding to the second graphic object when the spatial position of the input device is moved away from the terminal body outside the reference range, while the specific sub menu is displayed;
- in a state that one portion of the input device is recognized, detecting a switching of polar directions of a dipole magnet disposed in the input device in response to another end portion of the input device touching a portion of the terminal body near a side edge of the touch screen;
- displaying a handler image notifying that icons of preset applications are output on an edge area of the touch screen based on detecting the switching of the polar directions of the dipole magnet; and
- displaying the icons of the preset applications on the edge area of the touch screen when a touch is applied to the handler image or the spatial position of the input device is fixed for a second predetermined time.

* * * * *